United States Patent
Rust

(10) Patent No.: US 11,185,053 B2
(45) Date of Patent: Nov. 30, 2021

(54) WALKWAY AND WALKWAY SYSTEM FOR AN AVIARY

(71) Applicant: Rose Acre Farms, Inc., Seymour, IN (US)

(72) Inventor: Marcus D. Rust, Remington, IN (US)

(73) Assignee: ROSE ACRE FARMS, INC., Seymour, IN (US)

(*) Notice: Subject to any disclaimer, the term of this patent is extended or adjusted under 35 U.S.C. 154(b) by 858 days.

(21) Appl. No.: 15/203,650

(22) Filed: Jul. 6, 2016

(65) Prior Publication Data

US 2018/0007869 A1 Jan. 11, 2018

(51) Int. Cl.
| | |
|---|---|
| *A01K 31/06* | (2006.01) |
| *A01K 31/22* | (2006.01) |
| *A01K 1/00* | (2006.01) |
| *A01K 31/00* | (2006.01) |
| *A01K 31/04* | (2006.01) |
| *A01K 45/00* | (2006.01) |
| *E04F 11/00* | (2006.01) |

(52) U.S. Cl.
CPC ............ *A01K 31/22* (2013.01); *A01K 1/0058* (2013.01); *A01K 31/00* (2013.01); *A01K 31/04* (2013.01); *A01K 45/00* (2013.01); *E04F 11/002* (2013.01); *E04F 2011/007* (2013.01)

(58) Field of Classification Search
CPC ...... A01K 31/06; A01K 31/12; A01K 31/002; A01K 31/22; A01K 45/005
USPC ................... 119/847–849, 428–443, 459–471
See application file for complete search history.

(56) References Cited

U.S. PATENT DOCUMENTS

| | | | |
|---|---|---|---|
| 838,851 A | 12/1906 | Dropeskey | |
| 1,500,081 A | 7/1924 | Knight | |
| 1,520,610 A | 12/1924 | Stephens | |
| 1,632,367 A | 6/1927 | Christiansen | |
| 1,674,193 A | 6/1928 | Coltrin | |
| 1,755,520 A | 4/1930 | Shoup | |
| 1,876,325 A | 9/1932 | Crawford | |
| 1,949,085 A | 2/1934 | Shallit | |
| 2,096,356 A | 10/1937 | Fox | |
| 2,174,326 A | 9/1939 | Leibenguth | |
| 2,176,814 A | 10/1939 | Hawkins | |
| 2,257,734 A | 10/1941 | Cornell | |
| 2,457,380 A * | 12/1948 | Kelberer | B60P 1/6454 |
| | | | 182/88 |
| 2,457,818 A | 1/1949 | Helman | |
| 2,565,521 A | 8/1951 | Ratermann | |

(Continued)

FOREIGN PATENT DOCUMENTS

| | | |
|---|---|---|
| AU | 201425949 | 11/2013 |
| BE | 787130 | 1/1974 |

(Continued)

OTHER PUBLICATIONS

Big Dutchman, Natura60 & Natura70 The Modern aviaries for barn and free range egg productions, product brochure, Mar. 2010.

(Continued)

*Primary Examiner* — Peter M Poon
*Assistant Examiner* — Danielle A Clerkley
(74) *Attorney, Agent, or Firm* — Ice Miller LLP

(57) ABSTRACT

The present embodiments provide an aviary, a walkway for an aviary, and a walkway system for an aviary. The walkway includes a ramp and at least one support disposed below the ramp.

3 Claims, 16 Drawing Sheets

(56) References Cited

U.S. PATENT DOCUMENTS

| | | | | |
|---|---|---|---|---|
| 2,692,578 | A | 10/1954 | Manning | |
| 2,695,006 | A | 11/1954 | Tellefson | |
| 2,805,644 | A | 9/1957 | Lieberman | |
| 2,882,857 | A | 4/1959 | Ernst et al. | |
| 2,956,539 | A | 10/1960 | Boening | |
| 2,970,567 | A | 2/1961 | Rubin | |
| 3,002,494 | A | 10/1961 | Murray | |
| 3,046,940 | A | 7/1962 | Kurtz | |
| 3,062,185 | A | 11/1962 | Kurtz | |
| 3,119,375 | A | 1/1964 | Ernst | |
| 3,124,101 | A | 3/1964 | Wierenga, Sr. | |
| 3,124,102 | A | 3/1964 | Kurtz et al. | |
| 3,134,358 | A | 5/1964 | Byrnes | |
| 3,139,065 | A | 6/1964 | Willauer, Jr. | |
| 3,164,129 | A | 1/1965 | Rigterink | |
| 3,208,430 | A | 9/1965 | Ernst | |
| 3,242,904 | A | 3/1966 | Rannou | |
| 3,274,973 | A | 9/1966 | Woods et al. | |
| 3,312,194 | A | 4/1967 | Ernst | |
| 3,319,606 | A | 5/1967 | Virgil | |
| 3,339,528 | A | 9/1967 | Summerour | |
| 3,355,037 | A | 11/1967 | Dodd | |
| 3,396,702 | A | 8/1968 | Trussell | |
| 3,464,389 | A | 9/1969 | Seiderman | |
| 3,485,214 | A | 12/1969 | Burkholder | |
| 3,541,968 | A * | 11/1970 | Van Huis | A01K 45/005 104/249 |
| 3,552,359 | A | 1/1971 | Graves et al. | |
| 3,581,709 | A | 6/1971 | Van Huis et al. | |
| 3,618,734 | A | 11/1971 | Khan | |
| 3,757,741 | A * | 9/1973 | Siciliano | A01K 31/17 119/480 |
| 3,791,348 | A | 2/1974 | Marnett | |
| 3,796,189 | A | 3/1974 | Blondeel | |
| 3,867,903 | A | 2/1975 | Fleshman | |
| 3,892,201 | A | 7/1975 | Crawford | |
| 3,900,006 | A | 8/1975 | Shockley | |
| 3,976,032 | A | 8/1976 | Ramser et al. | |
| 3,978,819 | A | 9/1976 | Lovitt | |
| 4,008,690 | A | 2/1977 | Van Huis | |
| 4,011,837 | A | 3/1977 | Ksioszk | |
| 4,020,793 | A | 5/1977 | Morrison | |
| 4,023,531 | A | 5/1977 | Thompson | |
| 4,084,714 | A * | 4/1978 | Williams | A01K 45/005 119/401 |
| 4,134,545 | A | 1/1979 | Westbrook | |
| 4,141,320 | A | 2/1979 | Hatfield | |
| 4,151,811 | A | 5/1979 | Truhan | |
| 4,173,947 | A | 11/1979 | Whiteside | |
| 4,188,911 | A | 2/1980 | Rafaely | |
| 4,228,729 | A | 10/1980 | Messick | |
| 4,242,809 | A | 1/1981 | Elder | |
| 4,249,461 | A | 2/1981 | Christenson | |
| 4,250,837 | A | 2/1981 | Cocklereece | |
| 4,315,481 | A | 2/1982 | Coile et al. | |
| 4,321,887 | A | 3/1982 | Martin et al. | |
| 4,379,439 | A | 4/1983 | Baur | |
| 4,416,219 | A | 11/1983 | Dill | |
| 4,430,960 | A | 2/1984 | Nagel et al. | |
| 4,437,433 | A | 3/1984 | Nijhof | |
| 4,462,334 | A | 7/1984 | Kim | |
| 4,474,137 | A | 10/1984 | Walters | |
| 4,480,588 | A | 11/1984 | Holladay et al. | |
| 4,574,737 | A | 3/1986 | Bugeja | |
| 4,653,430 | A | 3/1987 | Mass et al. | |
| 4,766,849 | A | 8/1988 | Kawabata et al. | |
| 4,841,909 | A | 6/1989 | Siciliano | |
| 4,930,446 | A | 6/1990 | Huisinga | |
| 4,936,257 | A | 6/1990 | Kuhlmann | |
| 5,094,186 | A | 3/1992 | Andersen | |
| 5,145,460 | A | 9/1992 | Smith | |
| 5,174,242 | A | 12/1992 | Takeuchi | |
| 5,279,254 | A | 1/1994 | Dowty | |
| 5,413,068 | A * | 5/1995 | Segal | A01K 15/025 119/468 |
| 5,474,025 | A * | 12/1995 | Lee | A01K 15/025 119/464 |
| 5,477,810 | A | 12/1995 | Wilkison, III | |
| 5,492,082 | A | 2/1996 | Krevinghaus | |
| 5,570,657 | A | 11/1996 | Kuhlmann | |
| 5,596,949 | A | 1/1997 | Fanguy | |
| 5,662,068 | A | 9/1997 | Childs | |
| 5,666,905 | A | 9/1997 | Mackin et al. | |
| 5,713,302 | A | 2/1998 | Walter | |
| 5,749,321 | A | 5/1998 | Ikuse | |
| 5,827,118 | A | 10/1998 | Johnson | |
| 5,897,285 | A | 4/1999 | Wanderscheid | |
| 5,924,383 | A * | 7/1999 | Smith | A01K 1/0157 119/165 |
| 6,119,634 | A * | 9/2000 | Myrick | A01K 1/0272 119/847 |
| 6,217,437 | B1 | 4/2001 | Murray | |
| 6,234,114 | B1 | 5/2001 | Dyer | |
| 6,264,522 | B1 * | 7/2001 | Dickson | A44C 13/00 446/102 |
| 6,286,456 | B1 | 9/2001 | Michaelis | |
| 6,321,687 | B1 | 11/2001 | Lemmon | |
| 6,394,031 | B1 | 5/2002 | Moller | |
| 6,412,439 | B1 | 7/2002 | Otto-Lubker et al. | |
| 6,598,562 | B1 | 7/2003 | Dutkiewicz et al. | |
| 6,637,374 | B2 | 10/2003 | Hawks | |
| 6,688,835 | B1 | 2/2004 | Buher | |
| 6,691,645 | B1 * | 2/2004 | Ayers, Jr. | A01K 1/035 119/847 |
| 6,810,833 | B2 | 11/2004 | Bonner | |
| 6,883,464 | B2 * | 4/2005 | Kirch | A01K 31/06 119/459 |
| 6,968,807 | B2 | 11/2005 | Kuhlmann | |
| 7,011,045 | B1 * | 3/2006 | Zehner | A01K 1/035 119/673 |
| 7,036,457 | B2 | 5/2006 | Uchiyama | |
| 7,320,294 | B2 | 1/2008 | Irwin | |
| 7,350,364 | B2 | 4/2008 | Meerpohl | |
| 7,467,602 | B2 | 12/2008 | Yoshida | |
| 7,818,894 | B2 | 10/2010 | Noyes et al. | |
| 7,827,938 | B2 | 11/2010 | Kuehlmann | |
| 8,117,994 | B1 | 2/2012 | Goodlow | |
| 8,132,535 | B2 | 3/2012 | Correa | |
| 8,205,577 | B2 | 6/2012 | Sia | |
| 8,312,846 | B1 | 11/2012 | Murray | |
| 8,651,053 | B2 | 2/2014 | Reid | |
| 8,776,727 | B1 | 7/2014 | Nelligan | |
| 8,991,123 | B2 | 3/2015 | Micka | |
| 9,347,451 | B2 | 5/2016 | Priest | |
| 10,130,078 | B2 | 11/2018 | Rust et al. | |
| 10,375,935 | B2 | 8/2019 | Rust et al. | |
| 2004/0144326 | A1 | 7/2004 | Smith | |
| 2004/0144329 | A1 | 7/2004 | Kuhlmann | |
| 2005/0115522 | A1 * | 6/2005 | Bishop | A01K 1/035 119/847 |
| 2007/0131178 | A1 * | 6/2007 | Edgar | A01K 1/035 119/847 |
| 2008/0173250 | A1 | 7/2008 | Dowty | |
| 2008/0302312 | A1 * | 12/2008 | Steffey | A01K 1/035 119/849 |
| 2009/0084323 | A1 | 4/2009 | Tsubai | |
| 2009/0300860 | A1 | 12/2009 | Campbell | |
| 2011/0061601 | A1 | 3/2011 | Correa | |
| 2012/0055414 | A1 | 3/2012 | Correa | |
| 2015/0122190 | A1 | 5/2015 | Rust et al. | |
| 2015/0122191 | A1 | 5/2015 | Rust et al. | |
| 2015/0122192 | A1 | 5/2015 | Rust et al. | |
| 2015/0122193 | A1 | 5/2015 | Rust et al. | |
| 2015/0122195 | A1 | 5/2015 | Rust et al. | |
| 2015/0126105 | A1 | 5/2015 | Rust et al. | |
| 2015/0230432 | A1 | 8/2015 | Rust et al. | |
| 2015/0230433 | A1 | 8/2015 | Dart | |
| 2016/0227726 | A1 | 8/2016 | Priest | |

FOREIGN PATENT DOCUMENTS

| | | |
|---|---|---|
| CH | 662244 A5 | 9/1987 |
| DE | 1947908 | 6/1971 |

(56) References Cited

FOREIGN PATENT DOCUMENTS

| | | |
|---|---|---|
| DE | 20317631 | 3/2004 |
| DE | 20317631 U1 | 4/2004 |
| EP | 0904690 A1 | 3/1999 |
| EP | 1477057 A1 | 11/2004 |
| EP | 3209121 | 10/2014 |
| EP | 3209121 B1 | 10/2014 |
| EP | 2 878 195 A2 | 6/2015 |
| GB | 289033 | 7/1928 |
| GB | 591306 A | 8/1947 |
| GB | 631222 | 10/1949 |
| GB | 653190 | 5/1951 |
| GB | 735476 | 8/1955 |
| JP | 8172965 | 7/1996 |
| JP | 8172966 | 7/1996 |
| NL | 2000735 | 1/2009 |
| WO | 2016062701 A1 | 4/2016 |
| WO | WO 2016/062701 A1 | 4/2016 |

OTHER PUBLICATIONS

Agricultural Mfg. & Textiles, Inc., FingerBelt Laced With Fingers, Internet article, May 16, 2006, Agricultural Mgf. & Textiles, Inc.

Big Dutchman, Egg Production Photos, Internet Article.

Big Dutchman, The Modern Aviary for Layers in Floor Management, Internet Article, Sep. 12, 2012-Aug. 13, 2013.

Big Dutchman, Natura70: Flexible, efficient and profitable, Internet article, Sep. 12, 2012-Aug. 13, 2013.

Big Dutchman, Group Laying Nest for Optimum Egg Quality, Internet article, Sep. 12, 2012-Aug. 13, 2013.

Poultry times.net, CSES Research Examines Worker Health, Internet newspaper article, Oct. 4, 2013.

Potters Poultry International, Aviary, product brochure.

Vencomatic Group, Bolegg Terrace, product brochure.

"Het etagesysteem voor leghennen; Ontwikkeling en toetsing van een volieresysteem voor leghennen" (1980-1987), Dec. 1, 1987 (Dec. 1, 1987), XP055195185, Netherlands.

"Tiered Floor System for Laying Hens—development and testing of a henhouse system for laying hens" (1980-1987), Dec. 1, 1987 (Dec. 1, 1987) XP055195185, Netherlands, English Translation.

(EP14191765.8) European Patent Office, European Search Report, dated Jun. 23, 2015.

Big Dutchman, Natura, Natura60—The Modern Aviary for Layers in Floor Management, Internet Article.

Big Dutchman, Natura Step, Organic Cage-Free Layer System, The Modern Aviary for Layers, Internet Article.

Big Dutchman, Avech, Enrichable/Enriched Colony Housing Systems, Internet Article.

Big Dutchman, Colony 2+, Colony 2+ is an Automatic Group-Laying Nest for Optimum Egg Quality, Hen Welfare, and Efficient Management, Internet Article.

Karl-Ludwig Borchert, Braunschweig-Volkenrode, "Ein 2-Etagen-Lautstall fur Legehennen" (Jun. 1985), XP-002065271, p. 267-269, Lehrte, Deutschland.

Karl-Ludwig Borchert, Braunschweig-Volkenrode, "A 2-tier coop for laying hens" (Jun. 1985), XP-002065271, p. 267-269, Lehrte, Germany, English Translation.

Ing. A. Cappon, C. Ter Beek, W.F. Frederiks en IR. J.A.M. Voermans, "Alternative huisvesting voor eghennen (technisch verslag)" (Jun. 1986), Rapport 83, IMAG, Instituut voor Mechanisatie, Arbeid en Gebouwen, Wageningen.

Ing. A. Cappon, C. Ter Beek, W.F. Frederiks and IR. J.A.M. Voermans, "Alternative housing for laying hens (technical report)" (Jun. 1986), Report 83, IMAG, Institute for Mechanization, Labor, and Buildings, Wageningen, Netherlands, English Translation.

The Poultry Site, Massive Investment in Scottish Barn Egg Production, Feb. 20, 2014, Internet Article.

(EP15178388.3) European Patent Office, European Search Report, dated Apr. 1, 2016.

"Ein 2-Etagen-Lautstall Für Leghennen" Karl-Ludwig Borchert, Braunschweig-Völkenrode (1985), XP002065271.

"A 2-tier coop for laying hens" Karl-Ludwig Borchert, Braunschweig-Völkenrode (1985), XP002065271, English Translation.

"Alternatieve huisvesting voor leghennen" Ing. A. Cappon, C. ter Beek, W.F. Frederiks, and ir. J.A.M. Voermans (Jun. 1986), XP55194182.

"Alternative housing for laying hens" Ing. A. Cappon, C. ter Beek, W.F. Frederiks, and ir. J.A.M. Voermans (Jun. 1986), XP55194182, English Translation.

"Massive Investment in Scottish Barn Egg Production" The Poultry Site (Feb. 20, 2014).

TH.G.C.M. Fiks—Van Niekerk, B.F.J. Reuvekamp, R.A. Van Emous, M.A.W. Ruis, "Praktijk Rapport Pluimvee 6, Systeem van de toekomst voor leghennen", Praktijkonderzoek Veehouderij, Wageningen UR, Mar. 2003, Lelystad.

TH.G.C.M. Fiks—Van Niekerk, B.F.J. Reuvekamp, R.A. Van Emous, M.A.W. Ruis, "Research Report Poultry 6, System of the Future for Laying Hens", Institute for Animal Husbandry, Wageningen UR, Mar. 2003, Lelystad, English Translation.

First Examination Report, Systems and Methods for an Aviary, IP No. 701660, New Zealand Intellectual Property Office, dated Oct. 14, 2016.

Big Dutchman, The Modern Aviary for Layers in Floor Management, Internet article.

Big Dutchman, Natura, The Modern System for Rearing of Healthy Pullets, Internet Article.

Big Dutchman, Natura Sunrise, Multi-tier cage-free floor system for those who require cage-free and organic certification, Internet Article.

(EP14191765.8) European Patent Office, Written Opinion of the European Search Report, dated Jun. 23, 2015.

Big Dutchman, Natura 60, Select access multi tier aviary for barn an free range egg production, Internet Article.

Big Dutchman, Natura—Rearing The modern multi-level system for pullet rearing.

(EP17824682.3) European Patent Office, Written Opinion of the European Search Report, dated Mar. 3, 2020.

* cited by examiner

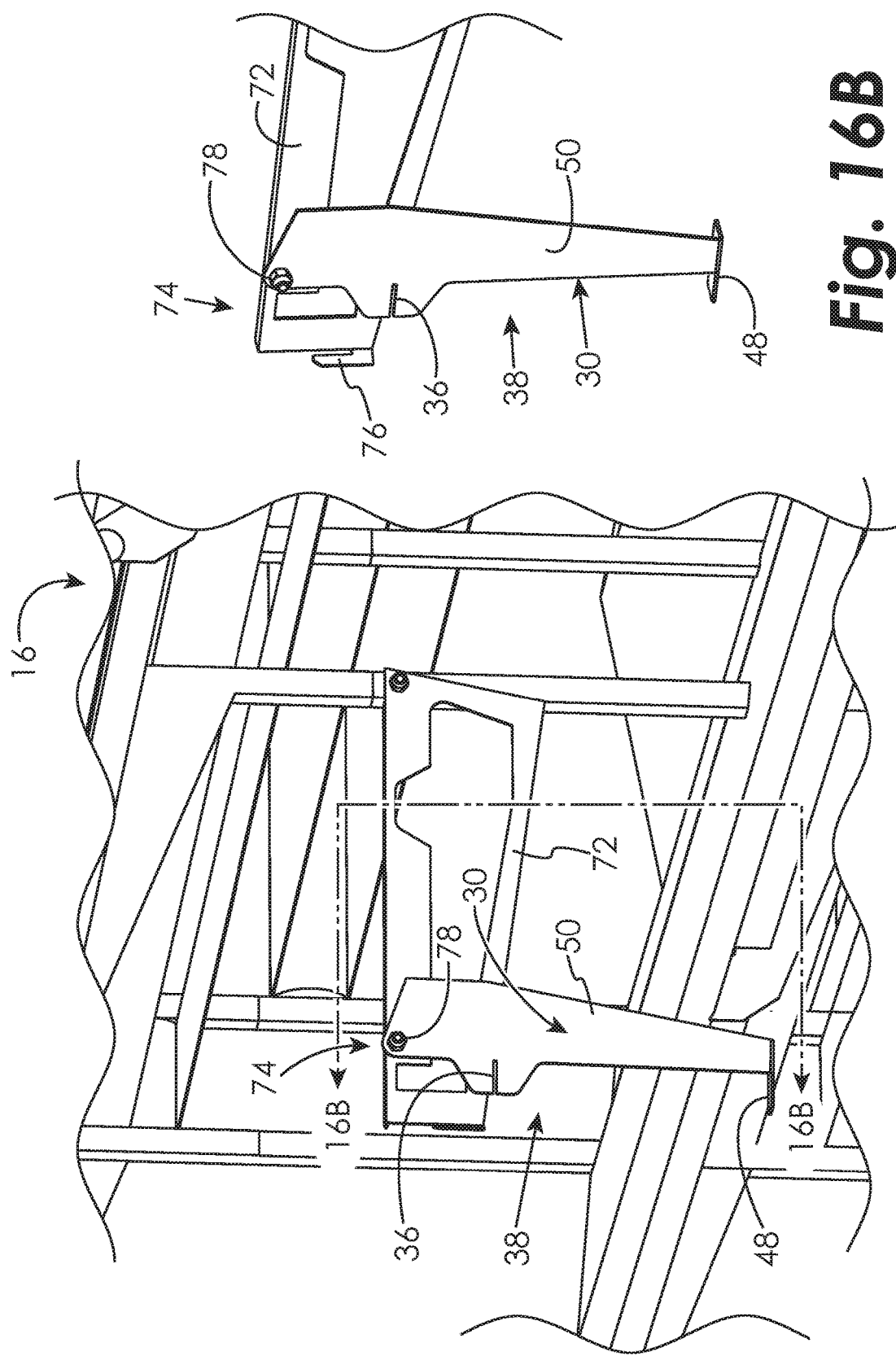

WALKWAY AND WALKWAY SYSTEM FOR AN AVIARY

TECHNICAL FIELD OF THE DISCLOSED EMBODIMENTS

The embodiments herein generally relate to aviaries and, more particularly, to an aviary walkway.

BACKGROUND OF THE DISCLOSED EMBODIMENTS

When birds are not continuously confined to a caged area and are permitted space to move freely inside an aviary, then the aviary may be considered "cage free." Cage-free aviaries may include one or more cage towers with multiple levels or floors of cages to maximize the number of birds being housed therein. Egg production is consequently maximized with multiple levels of cages housing birds. However, such multi-level cage towers require means for birds to access the cage tower from an aisle in order to be able to utilize the open space available to the birds.

Birds placed in a cage free environment for the first time may not understand immediately how to move from one level to another or from one cage tower to another across an aisle. Walkways and ramps in the aisle or other open space adjacent the cage tower facilitate use of the space by and training for birds that may not be familiar with hopping or flying between perches as a means to access various levels of the cage tower. Similarly, conventional internal stairwells facilitate use of all levels of a tower by the birds housed therein. Such conventional walkways, ramps, and stairwells may be made from cage wire bent into the shape of a ramp for use by the birds or from slatted wooden timbers or boards. Further, air moving in the cage tower may not be sufficiently turbulent or properly directed to sufficiently dry manure deposited in the cage tower.

Although initially desirable for such training purposes, a walkway may interfere with cage tower operations, including but not limited to, initial stocking of a house with birds and de-stocking birds upon the completion of a laying cycle, and egg, bird, or debris removal. Further, a walkway positioned in or near the aisle may reduce the amount of space available in the aisle. There exists a need in the art for an aviary walkway to allow birds to access a cage tower. There also exists a need in the art for an aviary walkway positioned in the path of moving air to cause turbulence to airflow in the aviary to enhance the manure drying capabilities of the moving air. There also exists a need for an aviary ramp that can be removed to thereby facilitate stocking and de-stocking of the aviary, cleaning, maintenance, and other operations in the aviary and increase the amount of space available in the open space next to the aviary cage or cage tower.

There exists a need in the art for a solid ramp for an aviary. There exists a need in the art for a ramp for an aviary that is easier to clean than prior designs. A need exists in the art for an aviary ramp that can increase the amount of available floor space for birds to occupy in the aviary. A need also exists in the art for a ramp having a surface configuration capable of permitting a bird to grip the surface for stability. A need exists in the art for a ramp having a surface that can cause pressure differences across a bird's foot in contact with the surface to enable the surface to be relatively self-cleaning as the bird negotiates the ramp.

SUMMARY OF THE DISCLOSED EMBODIMENTS

In one embodiment, a walkway for an aviary is provided in which the walkway includes a ramp having a ramp positioning member extending below the ramp. The walkway also includes at least one support disposed below the ramp, and the at least one support is configured to fix the ramp from horizontal movement.

The ramp positioning member may be configured to couple with the at least one support. The ramp positioning member may allow upward movement of the ramp when the ramp positioning member is coupled with the at least one support. The ramp positioning member may be a lip extending from a bottom side of the ramp. The at least one support may include a support positioning member, wherein the support positioning member is a slot configured to receive the lip. The ramp positioning member may be disposed on a cage side of the ramp. The at least one support may include a second ramp positioning member disposed on an aisle side of the ramp. The at least one support may comprise a plurality of supports each disposed below the ramp. Each of the plurality of supports may include a support positioning member. The ramp may be solid. The ramp may have an upper surface. The upper surface may be configured with ridges and valleys. The ramp may be configured to create air turbulence. The ramp may be metal.

In another embodiment, a walkway system for an aviary is provided. A ramp is configured for positioning alongside one or more aviary cages. At least one support is configured to support the ramp and configured to be retractable from an extended position to a retracted position. The ramp is fixed against horizontal movement when the at least one support is in the extended position and supporting the ramp.

The ramp may be free to move upward when the at least one support is in the extended position and supporting the ramp. The at least one support may include an elongated portion supporting a bottom side of the ramp when the at least one support is in the extended position. The extended position may be defined by the elongated portion extending in a substantially horizontal direction. The retracted position may be defined by the elongated portion extending downward.

In another embodiment, an aviary is provided. The aviary includes at least one cage tower, an aisle adjacent the at least one cage tower, and a ramp disposed in the aisle and adjacent the at least one cage tower and configured to facilitate bird access to the at least one cage tower. The aviary further includes at least one retractable bracket coupled to the at least one cage tower and configured to support the ramp when the at least one bracket is in an extended position.

The ramp may be solid. The ramps may have an upper surface. The upper surface may be configured with ridges and valleys. The ramps may be configured to create air turbulence. The at least one retractable bracket may be configured to fix the ramp from horizontal movement when the at least one retractable bracket is supporting the ramp and in the extended position. The at least one cage tower may include a plurality of levels. The at least one retractable bracket may comprise a plurality of retractable brackets. Each of the plurality of retractable brackets may be disposed at each of the plurality of levels. The ramp may comprise a first positioning member and the at least one retractable bracket may comprise a second positioning member. The first positioning member and the second positioning member may cooperate to fix the ramp from horizontal movement.

The first positioning member and the second positioning member may allow upward movement of the ramp when fixing the ramp from horizontal movement. The first positioning member may be a lip extending downward from the ramp. The second positioning member may be a slot configured to receive the lip. The first positioning member may be proximate the at least one cage tower. The at least one retractable bracket may include a third positioning member that is distal the at least one cage tower.

The aviary may further include at least one ramp hanger. The at least one ramp hanger may be defined by at least one hook disposed at an upper end of the ramp. The aviary may further include a hanger support configured to couple to the at least one ramp hanger. The at least one ramp hanger may include at least one slot configured to fit over the hanger support. The hanger support may be retractable.

BRIEF DESCRIPTION OF DRAWINGS

The embodiments described herein and other features, advantages and disclosures contained herein, and the manner of attaining them, will become apparent and the present disclosure will be better understood by reference to the following description of various exemplary embodiments of the present disclosure taken in conjunction with the accompanying drawings, wherein:

FIG. 16A is an enlarged perspective view of a bracket for a walkway for an aviary in accordance with an embodiment.

FIG. 16B is an enlarged perspective view of the bracket for the walkway for the aviary shown in FIG. 16A.

DETAILED DESCRIPTION

Figure 1:
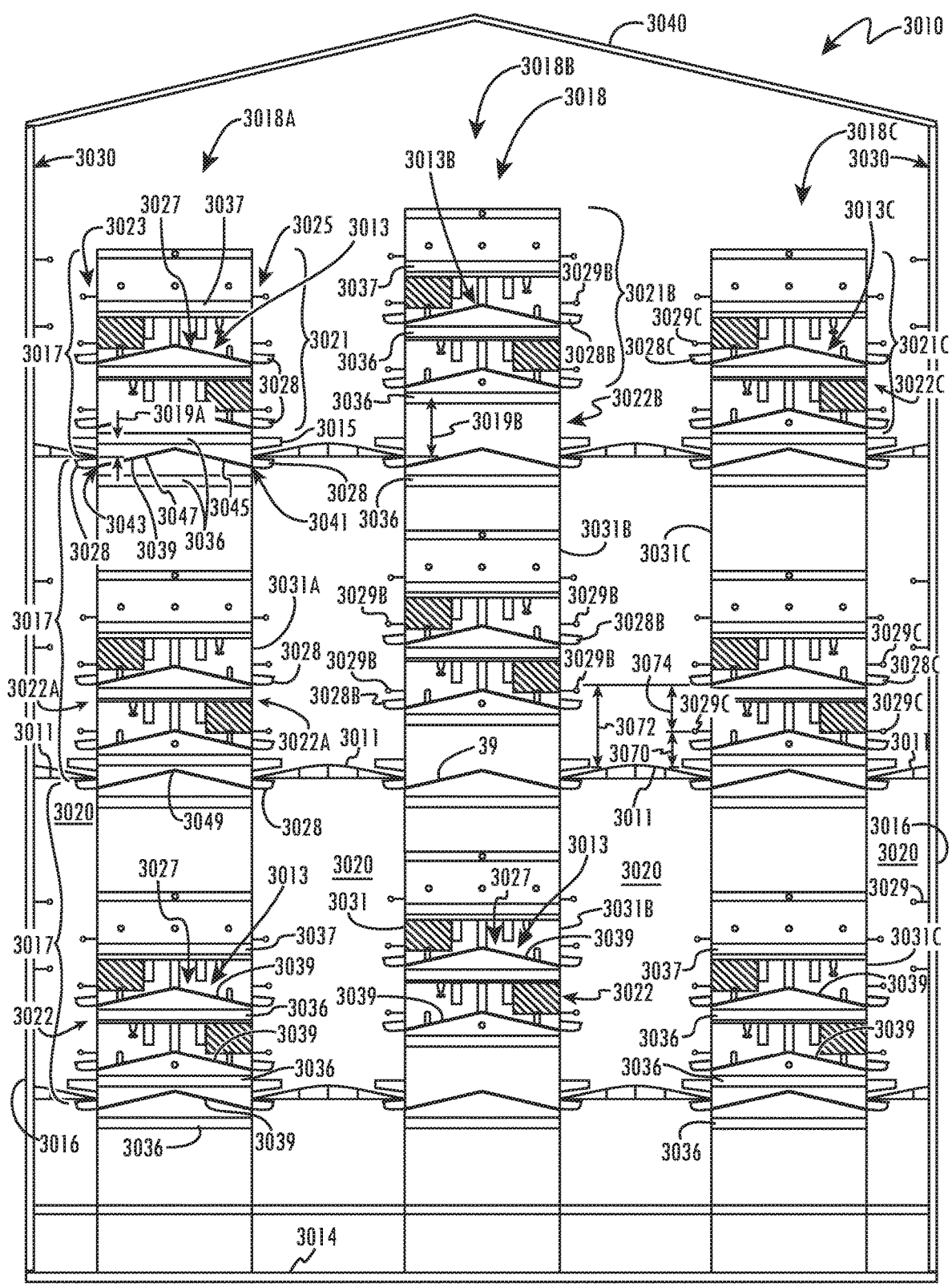
FIG. 1 is a front view of an aviary formed in accordance with an embodiment.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

The present embodiments provide aviaries having open space that may include a floor or platform serving as a pecking area where hens can move freely, peck the floor with their beaks, and scratch the floor with their feet. By permitting space for the hens to move freely, the aviary cages of the present embodiments satisfy the requirements for the birds contained thereby to be considered "cage free" birds. In other words, the hens are not continuously confined to a caged area. The present embodiments allow the removal of freshly laid eggs, which eggs may be sold under the label "cage free." The present embodiments also prevent eggs from becoming contaminated due to slow retrieval thereof from the scratching areas or cage floors (during which time the eggs could be infiltrated by bacteria, pecked or eaten by other birds, or otherwise damaged).

Some embodiments include at least one belt extending through the cage tower below the nesting area to remove a deposit from at least part of the cage tower. A deposit may include, but is not limited to, one or more items such as manure, an egg, litter, feathers, feed, or a dead bird. In one embodiment, the belt extends through the cage tower along the length of the cage tower. In one embodiment, the belt extends approximately 400 feet along the length of the cage tower. In one embodiment, the belt carries manure from the cage tower to a collection area (not shown) positioned outside of the cage tower. By removing deposits, particularly manure, from at least part of the cage tower, ammonia levels within the aviary are significantly reduced. Additionally, the need for an individual to enter the cage and clean the cage by hand is greatly reduced. Accordingly, the present embodiments permit one person to care for 150,000 to 200,000 birds, compared with the 3-5 people per 150,000 to 200,000 birds required when known cages and aviaries are used. The present embodiments also eliminate the requirement for extreme body positions, including squatting for extended periods of time and crawling and lying on the floor while loading and unloading the cage and while gathering eggs from the cage. The present embodiments further reduce potential respiratory hazards and infection hazards to the workers. If a hen lays an egg outside of the nesting area, the egg will be collected by the belt and carried to an egg collection area (not shown) positioned outside of the cage tower.

In the aviaries of one or more embodiments of the present disclosure, walkways and/or ramps are positioned in the aisle or other open space adjacent the cage tower to assist the birds while they learn how to move from one level to another around the cage tower or from one cage tower to another across an aisle or open space. The walkways allow the birds to walk between various levels. This movement of the birds up and down in the system facilitates training of the birds so that they become familiar with hopping or flying between perches as a means to access various levels of the cage tower.

Although initially desirable for such training purposes, walkways may interfere with cage tower cleaning and maintenance operations, egg removal, debris removal, and bird placement or removal. Further, a walkway positioned in or near the aisle may reduce the amount of space available in the aisle. At the beginning of a cycle, at the end of a cycle, and before or after a cleaning or maintenance operation, it is useful to remove a ramp and retract any ramp supports in order to clear a path for heavy bird moving carts or other carts, equipment, or personnel to bring birds into the system at the start of the cycle and remove the hens at the end of the cycle. Fixed walkways, ramps, and external stairwells would impede the movement of and access by heavy bird moving carts or other carts, equipment, or personnel adjacent a cage tower.

Therefore, a walkway system of one or more embodiments of the present disclosure includes one or more ramps to allow birds to access a cage tower. The ramp(s) are easily removed once the birds are comfortable with hopping and/or flying between perches or at any time when so desired. Removal of the ramps facilitates cleaning and other operations in the aviary and increases the amount of space available in the open space next to the aviary cage or cage tower. Increased open space facilitates natural bird behaviors and bird health.

An embodiment of the present disclosure is solid to make the ramp easier to clean than other materials such as wire mesh or wood. Such prior art materials suffer from uneven and/or porous surfaces that can harbor dirt and bacteria. One or more of the presently disclosed embodiments includes a solid ramp that can be cleaned easily. Such a ramp could be fabricated from steel or plastic or other materials known to the skilled artisan to be cleaned easily. One or more embodiments of the present disclosure include solid aviary ramps that can increase the amount of available floor space for birds to occupy in the aviary. This permits the aviary to house more birds than an aviary without such a walkway system and facilitates natural bird behaviors and bird health.

A walkway system of one or more embodiments of the present disclosure includes one or more ramps having a surface configuration capable of permitting a bird to grip the surface for stability. Such a surface assists in training birds to use a multi-level aviary because it provides a stable, safe surface for birds to use for traveling, roosting, and other daily activities. A walkway system of one or more embodiments of the present disclosure includes one or more ramps having a surface that can cause pressure differences across a bird's feet in contact with the surface to enable the surface to be relatively self-cleaning as the bird negotiates the ramp. The pressure differences help move deposits on the surface to a belt, a scratching platform, or the floor through the motions of the birds in the aviary.

Additionally, walkways and/or ramps of embodiments of the present disclosure positioned in the aisle or other open space adjacent the cage tower are solid and are positioned in the path of moving air, where they cause turbulence to airflow in the aviary. Such turbulence, especially with relatively low airflow rates, enhances the manure drying capabilities of the moving air. Further, the angled configuration of the walkways and/or ramps directs at least a portion of the moving air in a downward and/or outward direction into nesting areas and the bottom of each level, thereby enhancing manure drying in those areas.

It should be noted that the various elements of each of the embodiments described below may be combined in any manner to form new embodiments of an aviary.

FIG. 1 illustrates an aviary 3010 having a floor 3014, which aviary 3010 is enclosed by exterior walls 3016 and a roof 3040. The exterior walls 3016 define an interior surface 3030. The exterior walls 3016 enclose at least one cage tower 3018 where hens may be caged. Each at least one cage tower 3018 includes an outside surface 3031 enclosing an inside area 3032. In an embodiment having multiple cage towers, an aisle 3020 extends between each cage tower 3018 to provide an inspection area and space in which the birds housed in the aviary 3010 may move. In an embodiment, an aisle 3020 is positioned between a cage tower 3018 and the respective exterior wall 3016. In an embodiment having multiple cage towers, at least one scratching platform 3011 may extend between each at least one cage tower 3018. In an embodiment, a scratching platform 3011 may extend between the interior surface 3030 of each exterior wall 3016 and the adjacent cage tower 3018. In an embodiment, at least one scratching platform 3011 extends from at least one cage tower 3018.

In the illustrated embodiment of FIG. 1, a scratching platform 3011 extends between the grates 3039 of the cage towers 3018. In an embodiment having more than two cage towers 3018, a scratching platform 3011 may extend between any adjacent cage towers 3018. In an embodiment having a single cage tower 3018, a scratching platform 3011 may extend from the cage tower 3018. Additionally, a scratching platform 3011 may extend between a cage tower 3018 and an adjacent exterior wall 3016. In one embodiment, the scratching platform 3011 is planar with the grates 3039 between which the scratching platform 3011 extends. Alternatively, the scratching platform 3011 may be sloped toward the grates 3039, as illustrated in FIG. 1. The scratching platform 3011 extends into the open space 3020 of the aviary 3010.

The scratching platform 3011 provides yet another pecking area for the hens to utilize while they are not nesting. In particular, the scratching platform 3011 provides a scratching area for the hens to scratch and peck within the aviary 3010. When the birds scratch, they may scratch deposits on the scratching platform 3011 through the grates 3039 and onto the belt 3036. Accordingly, since it is common for birds to defecate in their scratching area, the scratching platform 3011 becomes self-cleaning as the hens scratch. The scratching platform 3011 is configured so that the deposits are scratched back to the grates 3039. Such configuration greatly reduces the amount of ammonia captured within the aviary 3010 while also reducing the requirement for frequent cleaning of the aviary 3010. Any eggs laid on the scratching platform 3011 may be directed back toward the grates 3039 by the scratching of the hens. These eggs are then collected in the egg conveyors 3028 and removed from the aviary 3010 to a collection area (not shown).

In an embodiment, the scratching platform 3011 is configured so that a worker can walk across the scratching platform 3011 between the cage towers 3018A and 3018B. In an embodiment, a scratching platform 3011 is configured so that a worker can walk between cage tower 3018A and the respective exterior wall 3016. In an embodiment, the scratching platform 3011 is configured so that a worker can walk across the scratching platform 3011 between the cage towers 3018C and 3018B. In an embodiment, a scratching platform 3011 is configured so that a worker can walk between cage tower 3018C and the respective exterior wall 3016.

In the illustrated embodiments, the scratching platforms 3011 form similarly configured levels 3017 in the aviary 3010, wherein each level 3017 may be accessed by a worker. A hen may walk, peck, scratch, socialize, sleep, and lay eggs, as the bird desires, in the inside area 3013. These same hen activities can be carried out on the at least one scratching platform 3011. The aviary cage 3021 may house a specific group of birds or it may be open to birds from other aviary cages 3021. In an embodiment, the cage tower 3018 may be configured to allow the birds to move freely up and down the cage tower 3018. In an embodiment, the cage tower 3018 may be configured to keep birds in the aviary 3010 segregated by vertical level 3017. In an embodiment, the cage tower 3018 may be configured to keep birds segregated horizontally within a level 3017 of the cage tower 3018.

Figure 2:
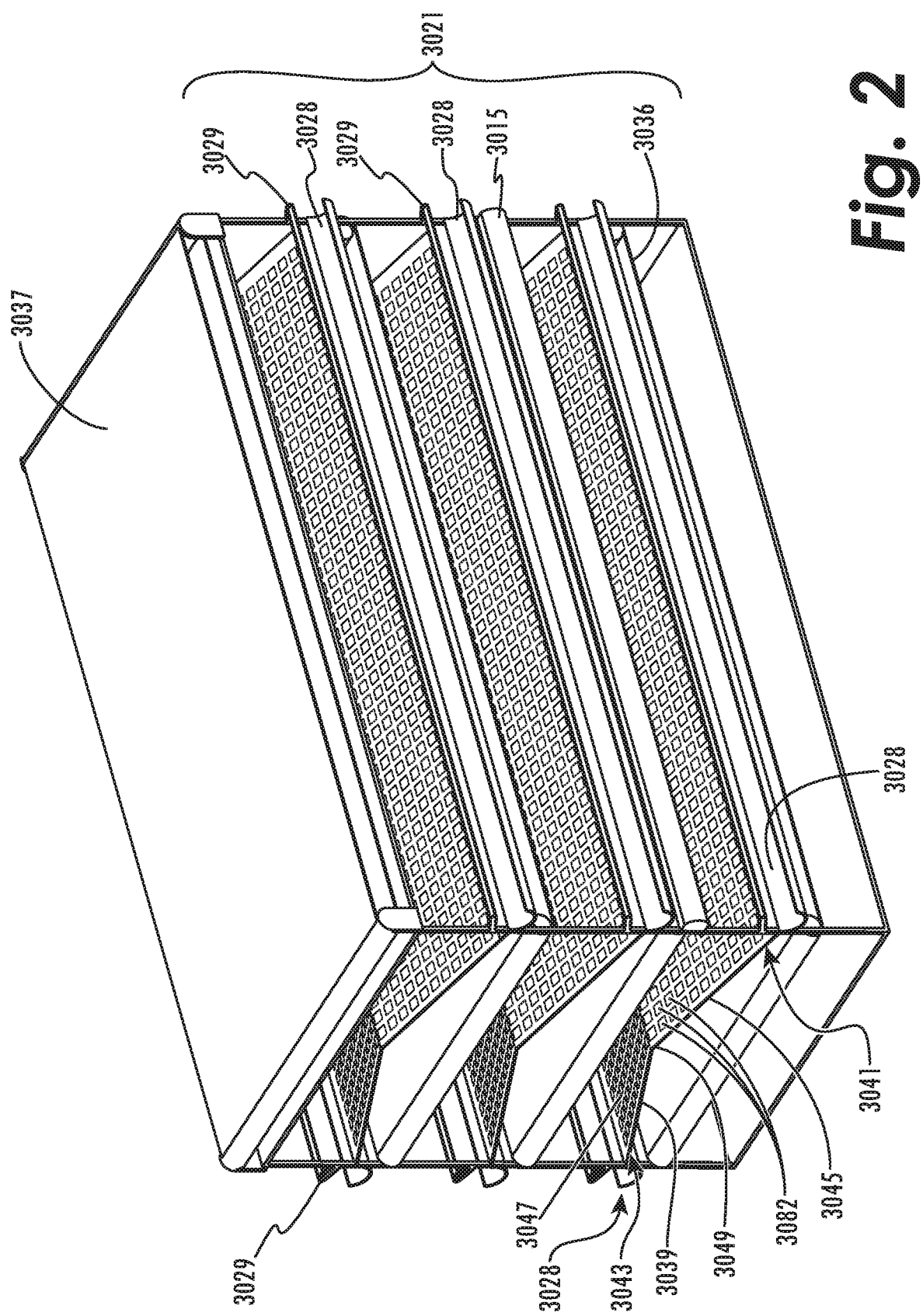
FIG. 2 is a side perspective view of an aviary cage shown in FIG. 1.
Figure 3:
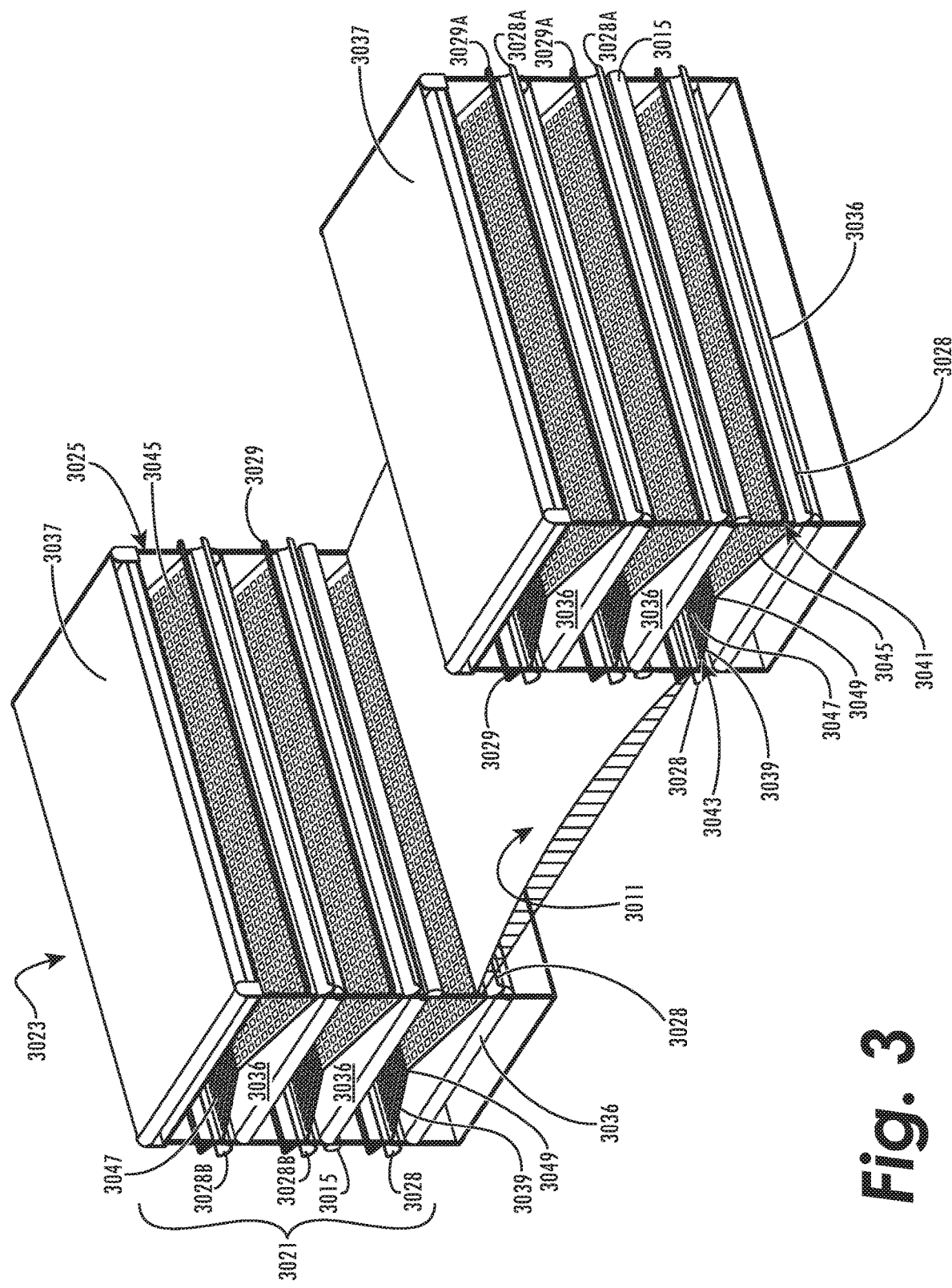
FIG. 3 is a side perspective view of a first aviary cage, a second aviary cage, and a scratching platform shown in FIG. 1.

FIGS. 2 and 3 illustrate at least one aviary cage 3021. Each at least one cage tower 3018 includes at least one aviary cage 3021. Each at least one aviary cage 3021 includes a first side 3025 and a second side 3023 enclosing an inside area 3013. At least one bump rail 3015 extends from each of the first side 3025 and the second side 3023 and into the respective aisle 3020 to allow equipment to be maneuvered through the aisle 3020 without damaging the at least one cage tower 3018 or the at least one aviary cage 3021. The bump rail 3015 may be used by the birds as a perch.

Each aviary cage 3021 includes at least one nesting area 3027. The nesting area 3027 provides space where a hen may sit to lay eggs. As the hens lay their eggs, the eggs are collected in egg conveyors 3028 that extend along the sides 3025 and 3023 of the aviary cage 3021. The egg conveyors 3028 carry the eggs from the nesting area 3027 to a collection area (not shown).

At least one belt 3036 extends through the cage tower 3018 to remove a deposit from at least part of the cage tower 3018. In an embodiment, a plurality of belts 3036 extends through the cage tower 3018 to remove deposits from at least part of the tower 3018. The plurality of belts 3036 are positioned at various vertical locations within each cage tower 3018. At least one belt 3036 of the plurality of belts 3036 is positioned below the nesting area 3027 of each aviary cage 3021. Additional belts 3036 of the plurality of belts 3036 extend through the nesting area 3027 of each aviary cage 3021. In one embodiment, at least one belt 3036 extends through the cage tower 3018 substantially the length of the cage tower 3018. In one embodiment, the belt 3036 extends approximately 400 feet along the length of the cage tower 3018. In one embodiment, the belt 3036 carries manure from the cage tower 3018 to a collection area (not shown) positioned outside of the cage tower 3018.

Figure 4:
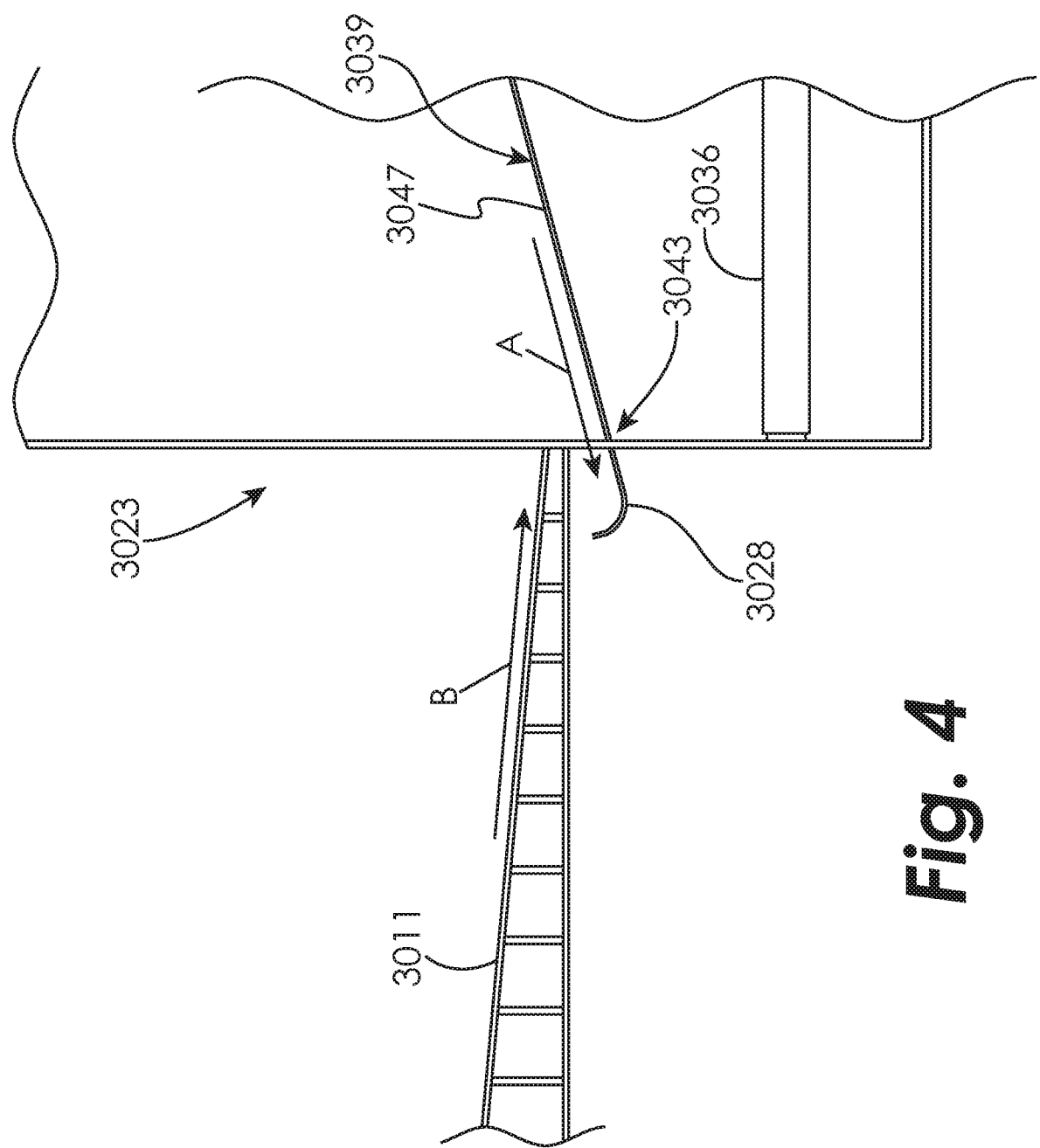
FIG. 4 is an expanded view of a scratching platform, a grate, a side of an aviary cage, and a belt formed in accordance with an embodiment.

In one embodiment, a grate 3039 is positioned over the belt 3036. A portion of the grate 3039 is illustrated in FIG. 4. As illustrated in FIGS. 2-4, the grate 3039 includes openings 3082 therethrough that allow deposits, but not eggs, to pass through the grate 3039 to the belt 3036. The grate 3039 has a first end 3041 and a second end 3043. The first end 3041 extends to the first side 3025 of the aviary cage 3021. The second end 3043 extends to the second side 3023 of the aviary cage 3021. In an embodiment (not shown), the grate 3039 is flat. In an embodiment, the grate 3039 is shaped so that it is sloped toward each end 3041 and 3043. Each end 3041, 3043 of the grate 3039 is positioned adjacent an egg conveyor 3028. The egg conveyors 3028 are adapted to carry eggs from the aviary cage 3021 to a collection area (not shown). In one embodiment, a grate 3039 is positioned over each belt 3036.

In an embodiment, a first portion 3045 of the grate 3039 is angled downward toward an egg conveyor 3028 positioned adjacent the first end 3041 of the grate 3039. In this embodiment, a second portion 3047 of the grate 3039 is angled downward toward an egg conveyor 3028 positioned adjacent the second end 3043 of the grate 3039. In one embodiment, the first portion 3045 and second portion 3047 of the grate 3039 each extend from a centerline 3049 of the grate 3039. In one embodiment, the first portion 3045 and the second portion 3047 are angled from the centerline 3049 at approximately a 7° to 8° angle. Eggs laid on the second portion 3047 of grate 3039 roll to the respective egg conveyor 3028 adjacent the second end 3043 of the grate 3039, which is in the direction of arrow A (shown in FIG. 4). The egg conveyor 3028 carries the eggs to the collection area. Eggs laid on the first portion 3045 of the grate 3039 roll to the respective egg conveyor 3028 adjacent the first end 3041 of the grate 3039. In an embodiment in which the grate 3039 is flat, the hens scratch the eggs to an egg conveyor 3028.

In the illustrated embodiment, a scratching platform 3011 extends between adjacent cage towers 3018. In an embodiment, a scratching platform 3011 extends between the cage tower 3018 and the respective exterior wall 3016. In some embodiments, the scratching platform is solid. The scratching platform 3011 is oriented with respect to at least one belt 3036. In one embodiment, the scratching platform 3011 is oriented with respect to a belt 3036 that extends below the nesting area 3027 of an aviary cage 3021. In one embodiment, the scratching platform 3011 is sloped to allow deposits to move back toward the belt 3036. In one embodiment, the scratching platform 3011 is crowned so that each side of the scratching platform 3011 slopes toward a belt 3036. In particular, in the crowned scratching platform embodiment, the scratching platform 3011 is sloped toward the grate 3039. In one embodiment (not shown), the scratching platform 3011 is flat. In an embodiment, the ends 3041 and 3043 of the grate 3039 are positioned below the scratching platform 3011 so that the egg conveyors 3028 extend below the scratching platform 3011.

The scratching platform 3011 provides a pecking area for the hens to utilize while they are not nesting. In particular, the scratching platform 3011 provides a scratching and socializing area for birds within the aviary 3010. When the birds scratch the scratching platform 3011, they scratch much of the deposits made on the scratching platform 3011 onto the respective belt 3036. Accordingly, since it is common for birds to defecate in a scratching area, the scratching platform 3011 becomes relatively self-cleaning as the hens scratch.

Particularly, by way of example, deposits may be scratched from the scratching platform 3011 in the direction of arrow B (shown in FIG. 4) toward the grate 3039. Deposits may be scratched toward a grate 3039 from either direction on the scratching platform 3011. The deposits small enough to pass through the openings 3082 (shown in FIG. 2) in the grate 3039 then pass through those openings 3082 and onto the belt 3036, from which they are removed from the aviary 3010. Such configuration greatly reduces the amount of ammonia captured within the aviary 3010 and also reduces the required frequency for cleaning of the aviary 3010. Those of skill in the art will appreciate that, while FIG. 4 illustrates the movement of a deposit toward the second end 3043 of the grate 3039, a mirror image of the movement of a deposit toward the first end 3041 of the grate 3039 may occur when a deposit is made on the first portion 3045 of the grate 3039 or on the scratching platform 3011 and scratched back toward the first end 3041 of the grate 3039.

Any eggs laid on the scratching platform 3011 are directed toward an egg conveyor 3028 by the scratching of the hens. By way of example and not of limitation, eggs laid on the scratching platform 3011 illustrated in FIG. 4 may be scratched in the direction of arrow B toward the grate 3039. Eggs may be scratched toward a grate 3039 from either direction on the scratching platform 3011. Upon reaching the grate 3039, the eggs roll or are scratched toward the respective egg conveyor 3028, such as, for example, in the direction of arrow A along the grate 3039, under the scratching platform 3011, and into the egg conveyor 3028. In an embodiment (not shown), eggs laid on a flat scratching platform 3011 are rolled by the scratching of the hens toward the grate 3039 and, upon reaching the grate 3039, are scratched by the hens into the egg conveyor 3028.

In the illustrated embodiment, a first cage tower 3018A includes a first aviary cage 3021A, and a second cage tower 3018B includes a second aviary cage 3021B, which second aviary cage 3021B is similar to the first aviary cage 3021A. A third cage tower 3018C includes a third aviary cage 3021C, which third aviary cage 3021C is similar to the first aviary cage 3021A and the second aviary cage 3021B. In an embodiment, multiple first aviary cages 3021A are stacked on top of one another. In an embodiment, each first aviary cage 3021A has a first outside surface 3022A enclosing an inside area 3013A. In an embodiment, multiple second aviary cages 3021B are stacked on top of one another. In an embodiment, each second aviary cage 3021B includes a second outside surface 3022B enclosing an inside area 3013B. In an embodiment, multiple third aviary cages 3021C are stacked on top of one another. In an embodiment, each third aviary cage 3021C includes a third outside surface 3022C enclosing an inside area 3013C. The second aviary cage 3021B is positioned adjacent the first aviary cage 3021A and an aisle 3020 is formed therebetween. The second aviary cage 3021B is also positioned adjacent the third aviary cage 3021C and an aisle 3020 is formed therebetween. The second aviary cage 3021B is positioned at a height 3019B from the scratching platform 3011. The first aviary cage 3021A is positioned at a height 3019A from the scratching platform 3011. Height 3019B is greater than height 3019A.

Referring to an embodiment, a first perch 3029A extends from the first outside surface 3031A of the first cage tower 3018A and is positioned above a first egg conveyor 3028A that extends from the first outside surface 3031A along the sides 3025 and 3023 of the aviary cage 3021A. The first egg conveyor 3028A extends substantially the length of the first cage tower 3018A. When the hens lay their eggs, the eggs may be collected in the first egg conveyor 3028A. The first egg conveyor 3028A carries the eggs from the aviary cage 3021A to a collection area (not shown). The first perch 3029A extends into the aisle 3020 at a first vertical distance 3070 from the scratching platform 3011. A second perch 3029B extends from the second outside surface 3031B of the second cage tower 3018B and is positioned above a second egg conveyor 3028B that extends from the second outside surface 3031B along the sides 3025 and 3023 of the aviary cage 3021B. The second egg conveyor 3028B extends substantially the length of the second cage tower 3018B. The second egg conveyor 3028B carries the eggs from the aviary cage 3021B to a collection area (not shown). The second perch 3029B extends into the aisle 3020 at a second vertical distance 3072 from the scratching platform 3011. The first vertical distance 3070 is not equal to the second vertical distance 3072. In an embodiment, the first vertical distance 3070 and the second vertical distance 3072 define a third vertical distance 3074. The third vertical distance 3074 is configured to permit a bird to hop from the first perch 3029A to the second perch 3029B or vice versa. In an embodiment, at least one perch 3029 extends from interior surface 3030.

In an embodiment, the first cage tower 3018A may include multiple first perches 3029A, corresponding to the number of first egg conveyors 3028A, and the second cage tower 3018B may include multiple second perches 3029B, corresponding to the number of second egg conveyors 3028B, wherein the first perches 3029A and the second perches 3029B are staggered in relation to each other along the first and second outside surfaces 3031A, 3031B of the cage towers 3018A, 3018B. In one embodiment, the first perches 3029A and the second perches 3029B are staggered vertically on the first and second outside surfaces 3031A, 3031B of the cage towers 3018A, 3018B. In one embodiment, the first perches 3029A and the second perches 3029B are staggered horizontally along the first and second outside surfaces 3031A, 3031B of the cage towers 3018A, 3018B. In one embodiment, the first perches 3029A and the second perches 3029B are staggered vertically and horizontally on the first and second outside surfaces 3031A, 3031B of the cage towers 3018A, 3018B. In an embodiment, the first perches 3029A and the perches 3029 on inside surface 3030 are staggered vertically along the outside surface 3031A and the inside surface 3030. In an embodiment, the third perches 3029C and the perches 3029 on inside surface 3030 are staggered vertically along the outside surface 3031C and the inside surface 3030.

In the illustrated embodiments, the scratching platforms 3011 form three levels 3017 in the aviary 3010, wherein each level 3017 may be accessed by a worker. A hen may walk, peck, scratch, socialize, sleep, and lay eggs, as the bird desires in the inside areas 3013, 3032. These same daily activities can be carried out on the at least one scratching platform 3011. The at least one aviary cage 3021 may house a specific group of birds or it may be open to birds from other aviary cages 3021. In an embodiment, the cage tower 3018 may be configured to allow the birds to move freely up and down the cage tower 3018. In an embodiment, the cage tower 3018 may be configured to keep birds in the aviary segregated by vertical level 3017. When the hens lay their eggs, the eggs may be collected in egg conveyors 3028 that extend along the sides of the aviary cage 3021. The egg conveyors 3028 carry the eggs from the aviary cage 3021 to a collection area.

When a first perch 3029A and a second perch 3029B are included in an embodiment, the first vertical distance 3070 and the second vertical distance 3072 define a third vertical distance 3074, which third vertical distance 3074 is configured to facilitate the behavior of birds to hop from one surface to another and thereby create a ladder effect between the outside surfaces 3022A, 3022B of the aviary cages 3021A, 3021B and, concomitantly, outside surfaces 3031A, 3031B of the cage towers 3018A, 3018B. In an embodiment, perches 3029 extending from an inside surface 3030 or an outside surface 3031 are configured relative to each other to facilitate the behavior of birds to hop from one surface to another and thereby create a ladder effect between the outside surface 3022 of an aviary cage 3021 and the inside surface 3030 of the aviary, and, concomitantly, the outside surface 3031 of a cage tower 3018 and the inside surface 3030 of the aviary.

In one embodiment, the grate 3039 is flat. In one embodiment, a first portion 3045 of the grate 3039 is angled downward toward the egg conveyor 3028 on side 3025 of aviary cage 3021, and a second portion 3047 of the grate 3039 is angled downward toward the egg conveyor 3028 on side 3023 of aviary cage 3021. In one embodiment, the belt 3036 is positioned to capture and transport debris that falls through the grate 3039. In one embodiment, a scratching platform 3011 is extended from the aviary cage 3021 adjacent to the grate 3039. In one embodiment, the scratching platform 3011 is sloped toward the grate 3039 to facilitate movement of a deposit on the scratching platform 3011 to the grate 3039. In one embodiment, the scratching platform 3011 is a solid floor. In one embodiment, a belt 3037 is extended above the aviary cage 3021. The belt 3037 is positioned to capture and transport deposits that fall onto it. Birds are allowed to move freely and walk on the belt 3037.

In an embodiment (not shown), the cage tower 3018 includes the belts 3036 without the grates 3039. In such an embodiment, the belts 3036, 3037 carry deposits from the cage tower 3018, as described previously. In particular, deposits may be scratched onto the belts 3036 from the scratching platform 3011. In one embodiment, eggs are laid directly on the belts 3036, 3037 and the birds walk on the moving belts 3036, 3037.

In one embodiment, a first aviary cage 3021A and a second aviary cage 3021B are provided and are positioned adjacent each other. In such an embodiment, the method includes extending an aisle 3020 between the first aviary cage 3021A and the second aviary cage 3021B. A first perch 3029A is extended from the first aviary cage 3021A and into the aisle 3020 at a first vertical distance 3070 from a scratching platform 3011. A second perch 3029B is extended from the second aviary cage 3021B and into the aisle 3020 at a second vertical distance 3072 from the scratching platform 3011. The first and second vertical distances 3070, 3072 from the scratching platform 3011 are not equal.

In one embodiment, the aviary 3010 includes a plurality of first perches 3029A and a plurality of second perches 3029B. The method in this embodiment includes horizontally offsetting the plurality of first perches 3029A from one another and horizontally offsetting the plurality of second perches 3029B from one another. In one embodiment, the aviary 3010 includes a plurality of first perches 3029A and a plurality of second perches 3029B, and the method includes vertically offsetting the plurality of first perches 3029A from one another and vertically offsetting the plurality of second perches 3029B from one another. In one embodiment, the first vertical distance 3070 and the second vertical distance 3072 define a third vertical distance 3074. The third vertical distance 3074 enables an animal to hop between the first perch 3029A and the second perch 3029B or vice versa. In such an embodiment, the perches 3029A, 3029B are offset as a result of the aviary cages 3021A, 3021B being positioned at different heights. Accordingly, by offsetting the heights 3019A, 3019B of the similar aviary cages 3021A, 3021B the perches 3029A, 3029B become offset.

It will be understood by one of ordinary skill in the art of aviary design that the offset cage and perch design may be replicated for as many cage tower combinations as are desired in an aviary 3010. In each case of an adjacent set of cage towers 3018, the perches 3029 of each cage tower 3018 or inside surface 3030 should be offset from the perches 3029 of the adjacent cage tower 3018 by the third vertical distance 3027 to enable a bird to hop from perch 3029 to perch 3029 through an open space in the aviary 3012 in a ladder-like manner. It will also be understood by one of ordinary skill that manufacturing, assembly, and installation time may be saved when building aviary 3010 when aviary cage units 3021 are similar to each other. Similar aviary cage units 3021 permit the construction of cage towers 3018 with perches 3029 that are offset in height from perches 3029 on cage towers 3018 that are separated by an aisle 3020 by installing the aviary cage unit 3021 in one cage tower 3018 at a height different from the height of installation for an aviary cage unit 3021 in an adjacent cage tower 3018.

Figure 5:
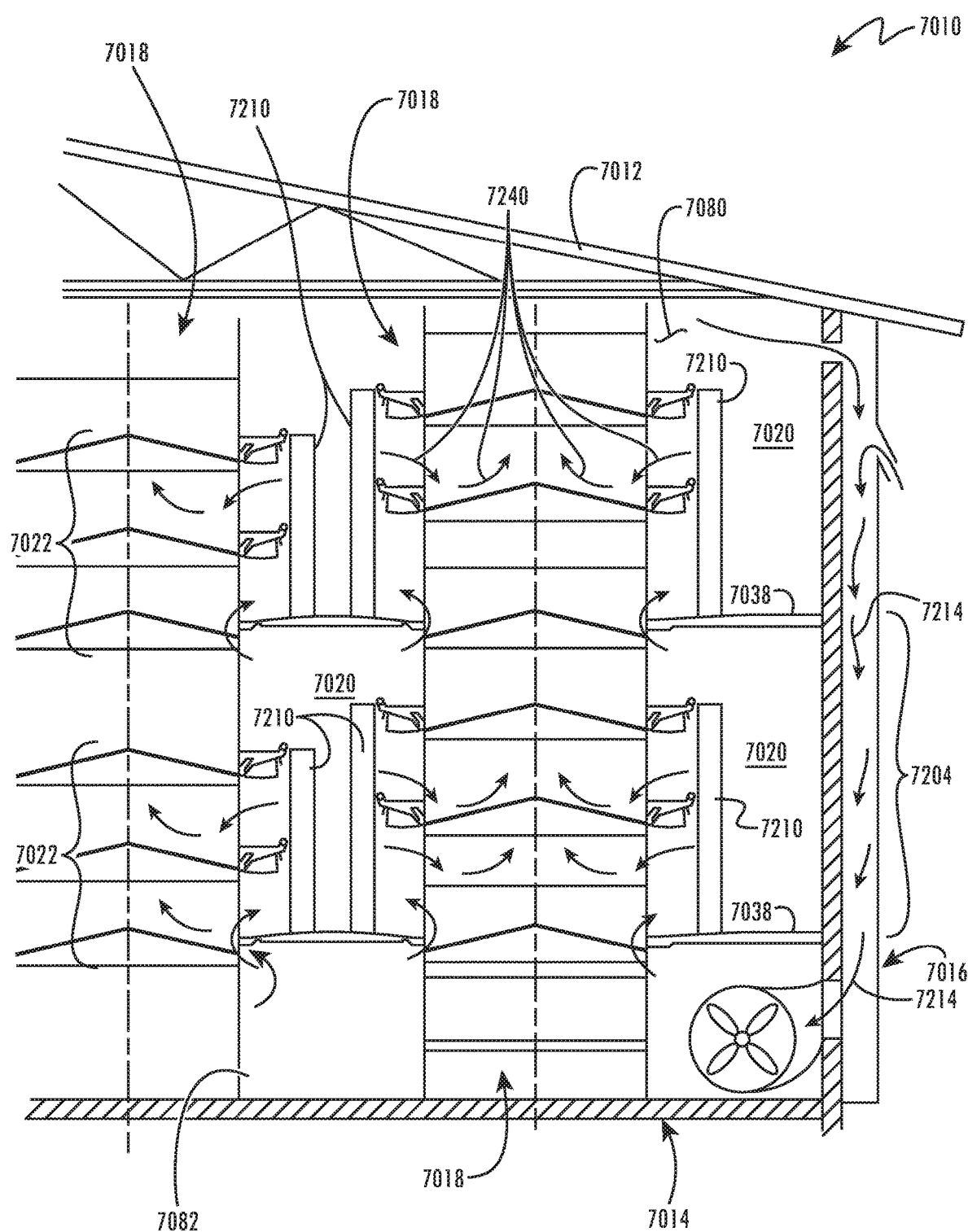
FIG. 5 is a front view of an aviary formed in accordance with an embodiment.
Figure 6:
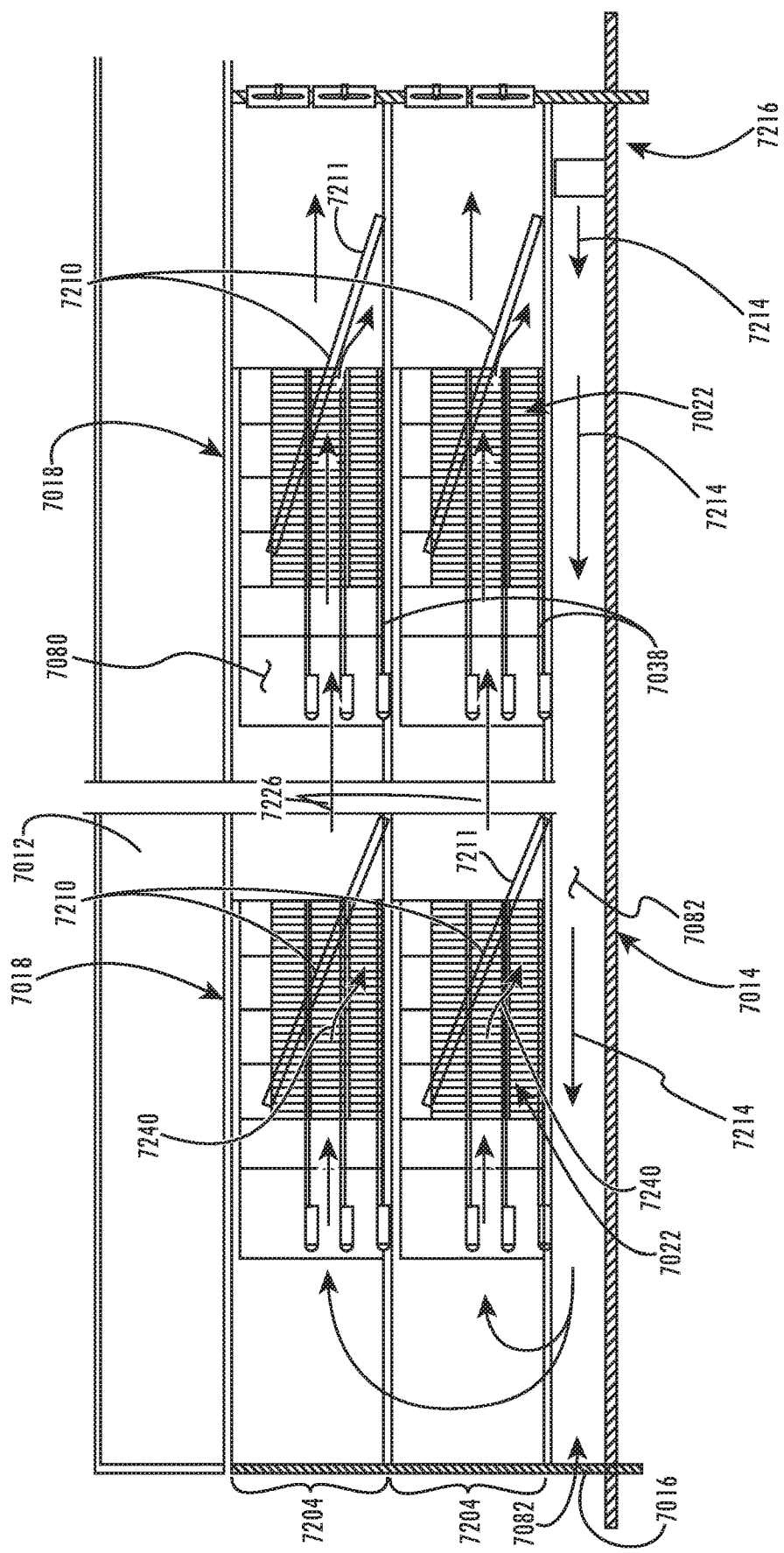
FIG. 6 is a side view of the aviary shown in FIG. 5.

FIGS. 5 and 6 illustrate an aviary 7010 configured to house hens. It should be noted that the aviary walkway and ventilation system described in FIGS. 5 and 6 may be utilized with any of the embodiments described in FIGS. 1-4 and the foregoing description. The aviary 7010 may include a floor 7014, walls 7016, and a roof 7012. At least one cage tower 7018 where hens may be caged is disposed within the aviary 7010. A bottom space 7082 of the aviary 7010 includes space above the floor 7014 and below a lowermost level 7204, as shown in FIG. 5. A top space 7080 of the aviary 7010 includes space adjacent to the roof 7012. The aviary 7010 may be constructed with any number of cage towers 7018, including a single cage tower 7018.

The cage towers 7018 of the embodiment shown in FIGS. 5 and 6 are disposed on the floor 7014 of the aviary 7010. Scratching platforms 7038 of the illustrated embodiment extend between the cage towers 7018 and from a cage tower to one or more walls 7016 to form a plurality of levels 7204. Each level 7204 includes one or more nesting areas 7022. Although FIGS. 5 and 6 show two levels 7204 in the aviary 7010, any number of levels 7204 may be used, including a single level.

In an embodiment, the one or more scratching platforms 7038 may provide stability to each of the cage towers 7018 by joining the cage towers 7018 together. In an embodiment, the one or more scratching platforms 7038 may join the cage tower 7018 that is adjacent one or more of the walls 7016 to the one or more respective walls 7016 to provide stability to the cage tower 7018.

The illustrated embodiment includes three cage towers 7018 in the aviary 7010. An open space 7020 extends between adjacent cage towers 7018 to provide an inspection area and facilitate airflow. In an embodiment having more than two cage towers 7018, an open space 7020 may extend between each adjacent cage tower 7018. In an embodiment having a single cage tower 7018, an open space 7020 is present on at least one side of the cage tower 7018. An open space 7020 may be positioned between the cage tower 7018 and one or more respective walls 7016. The open space 7020 may include a scratching platform 7038 serving as a pecking area where hens can move freely, peck the scratching platform with their beaks, and scratch the scratching platform with their feet.

In the illustrated embodiment shown in FIGS. 5 and 6, the two levels 7204 include the spaces 7020 above the scratching platforms 7038 adjacent each cage tower 7018. Walkways 7210 are disposed in the spaces 7020 to facilitate travel by a hen between the nesting area 7022 and the scratching platform 7038. In an embodiment, at least one walkway 7210 is provided on each side of each cage tower 7018. However, any number of walkways 7210 may be provided in one or more spaces 7020 of the aviary 7010 and still come within the scope of the present disclosure.

As shown in FIG. 6, walkways 7210 extend from the scratching platforms 7038 to the nesting areas 7022. It will be understood by one of ordinary skill in the art that the walkways 7210 have a width and are set at an angle to allow birds to comfortably traverse the walkways 7210 to access the nesting areas 7022.

In an embodiment shown in FIG. 6, moving air 7214 circulates around the walkways 7210 as it travels toward the first end 7216. The walkways 7210 are positioned in the path of the moving air 7214 and cause turbulence to the airflow 7226. Such turbulence, especially with relatively low airflow rates, enhances the manure drying capabilities of the moving air 7214. Further, the walkways 7210 are angled such that the upper surface 7211 of each walkway 7210 may be used by the birds for walking, roosting, nesting, and scratching. Some of the air moving in the direction 7226 hits the walkways 7210. The upper surface 7211 of each walkway 7210 faces at least partially in the direction 7226. This configuration directs at least a portion of the moving air 7214 moving in the direction 7226 in a downward and/or outward direction 7240 into the nesting areas 7022 and bottom of each level 7204, thereby further enhancing manure drying in those areas.

Figure 7:
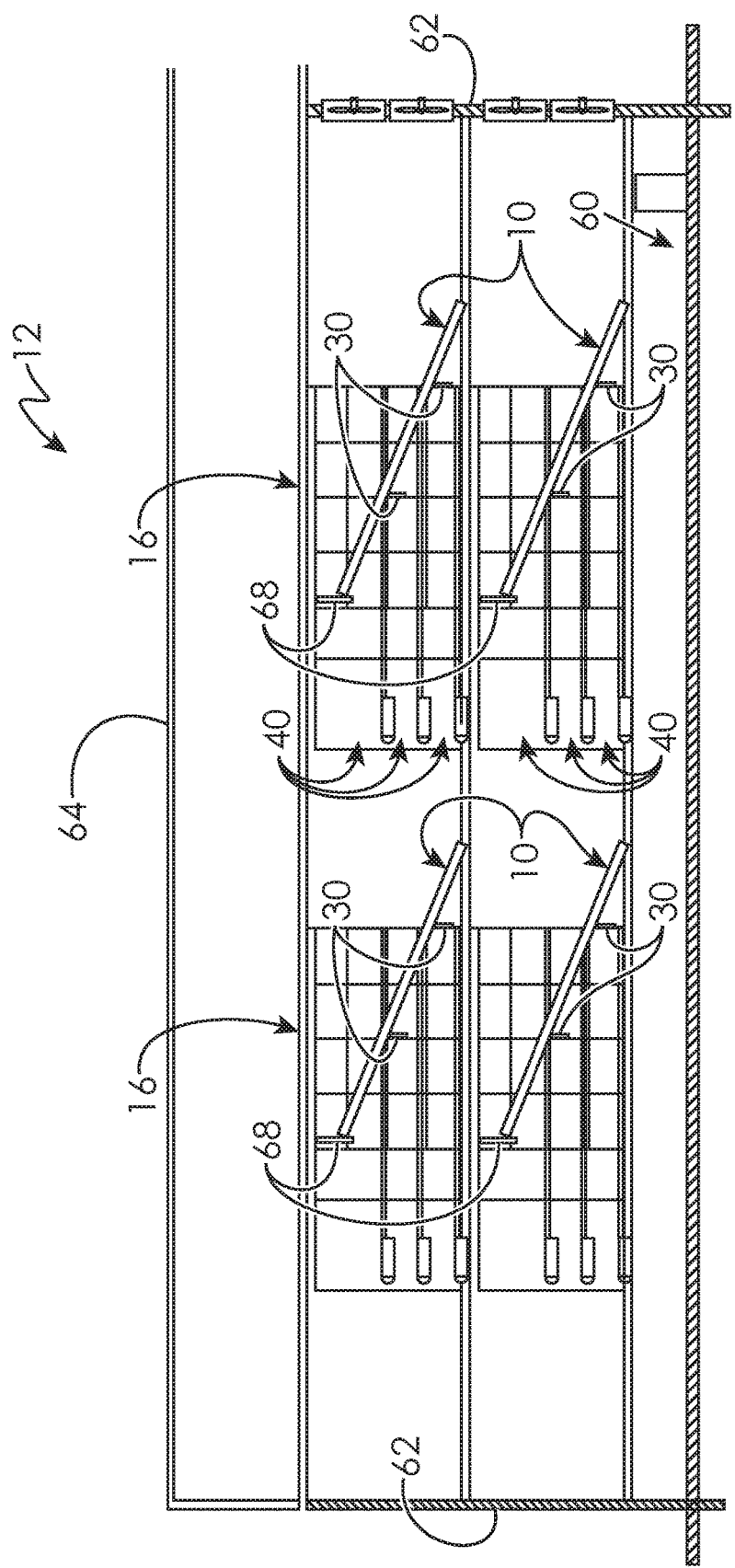
FIG. 7 is a side view of an aviary in accordance with an embodiment.

Referring now to FIG. 7, embodiments of the present disclosure include a walkway 10 for an aviary 12 and a walkway system for the aviary 12. It should be noted that the walkway 10 for the aviary 12 and the walkway system described in FIGS. 7-15 may be utilized with any of the embodiments described in FIGS. 1-6 and the foregoing description. The aviary 12 may include a floor 60, walls 62, and a roof 64. At least one cage tower 16 where hens may be caged is disposed within the aviary 12. The aviary 12 may be constructed with any number of cage towers 16, including a single cage tower 16. One or more embodiments of the aviary 12 and walkway 10 include one or more brackets or supports 30 coupled to the cage tower 16. The cage tower 16 further includes one or more vertically-aligned or stacked levels 40 in an embodiment. Each level 40 is an aviary cage in one or more particular embodiments. In an embodiment, each bracket 30 is disposed at each level 40. The cage tower 16 includes one or more hanger brackets 68 to support the walkway 10, as explained in more detail below.

Figure 8:
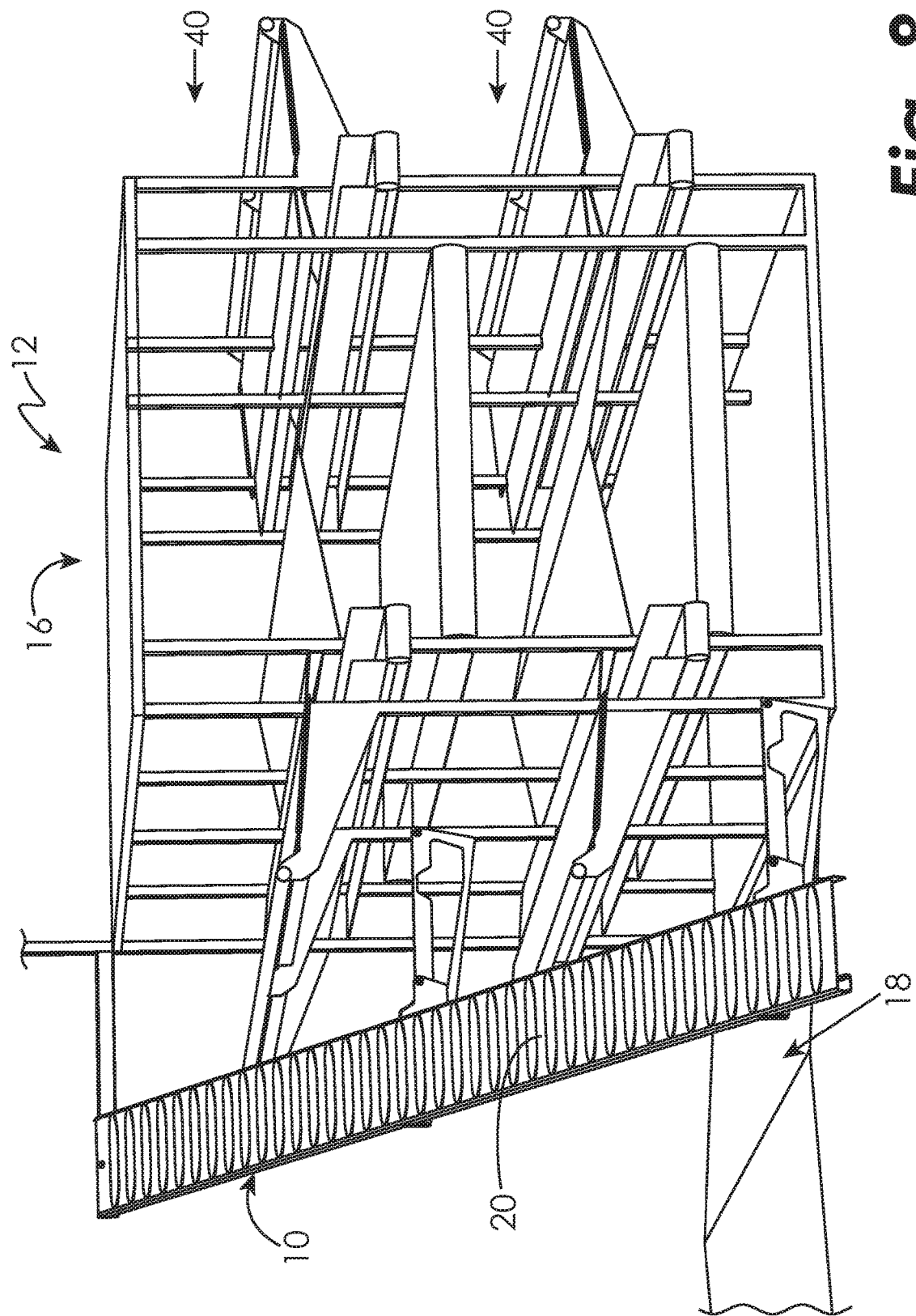
FIG. 8 is a perspective view of a walkway for an aviary in accordance with an embodiment.
Figure 9:
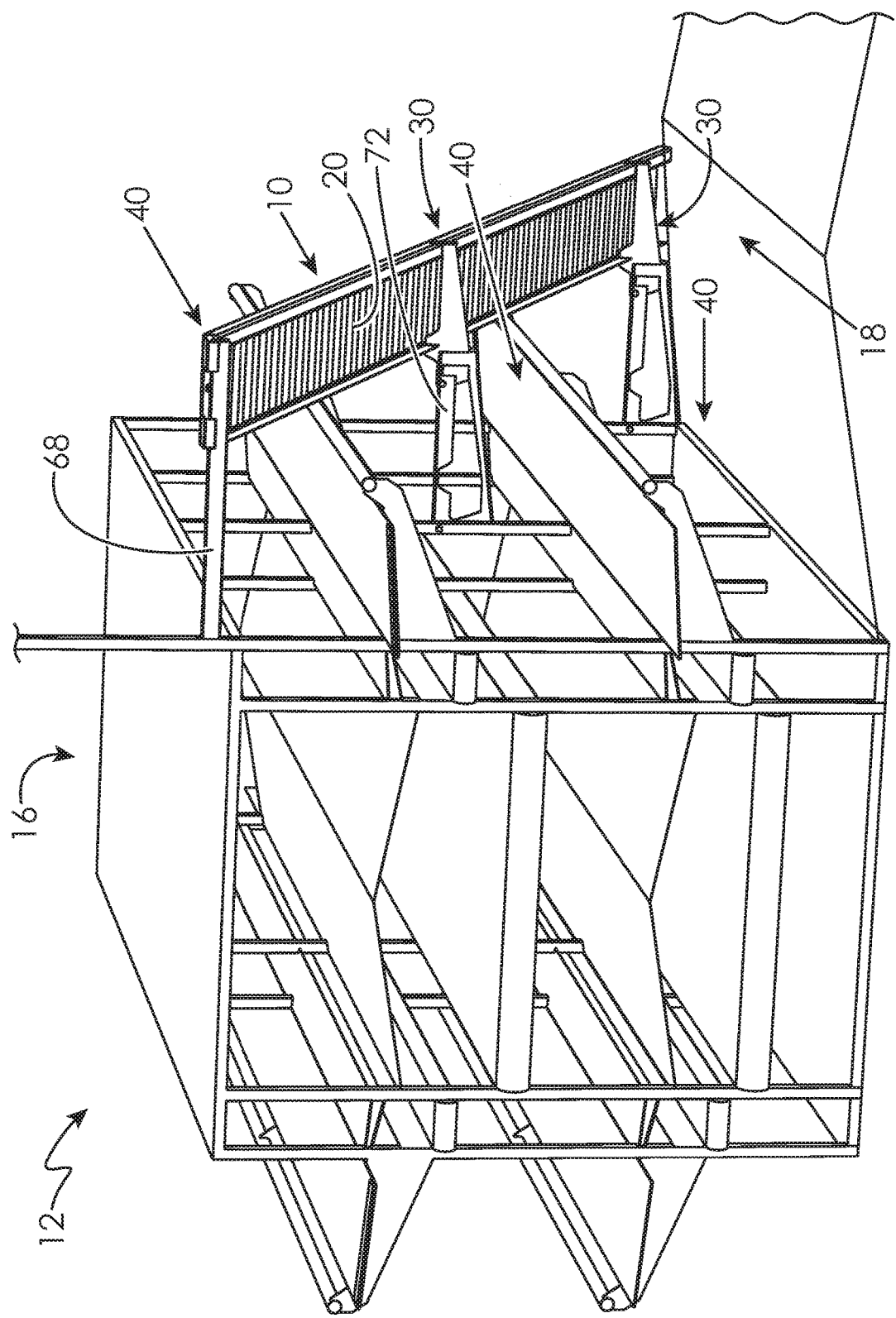
FIG. 9 is a perspective view of a walkway for an aviary in accordance with an embodiment.

As illustrated in FIGS. 8 and 9, the aviary 12 of an embodiment includes a cage tower 16, an aisle 18 adjacent the cage tower 16, and the walkway 10. The bracket 30 is coupled to a bracket support 72. The walkway 10 includes a ramp 20 disposed in the aisle 18 adjacent the cage tower 16 to facilitate bird access to the cage tower 16. In an embodiment, one or more walkways 10 are disposed in an open space (not shown) between the tower 16 and an inside wall surface of the aviary 12. In addition to the embodiments illustrated in FIGS. 8 and 9, an embodiment of the aviary 12 includes a walkway 10 that extends to any single level 40, including a lower level 40, rather than extending to the highest level 40. In an embodiment, the aviary 12 includes a walkway 10 that extends to every level 40 to serve the entire tower 16. In additional embodiments, the aviary 12 includes any number of multiple walkways 10 distributed down the length of the tower 16 such that each walkway 10 extends and/or serves different levels 40 of the tower 16. In further embodiments not shown, the aviary 12 includes two or more cage towers 16 with one or more walkways 10 at each cage tower 16. Each walkway 10 includes a ramp 20 disposed in one or more aisles 18 adjacent the two or more cage towers 16.

Figure 10:
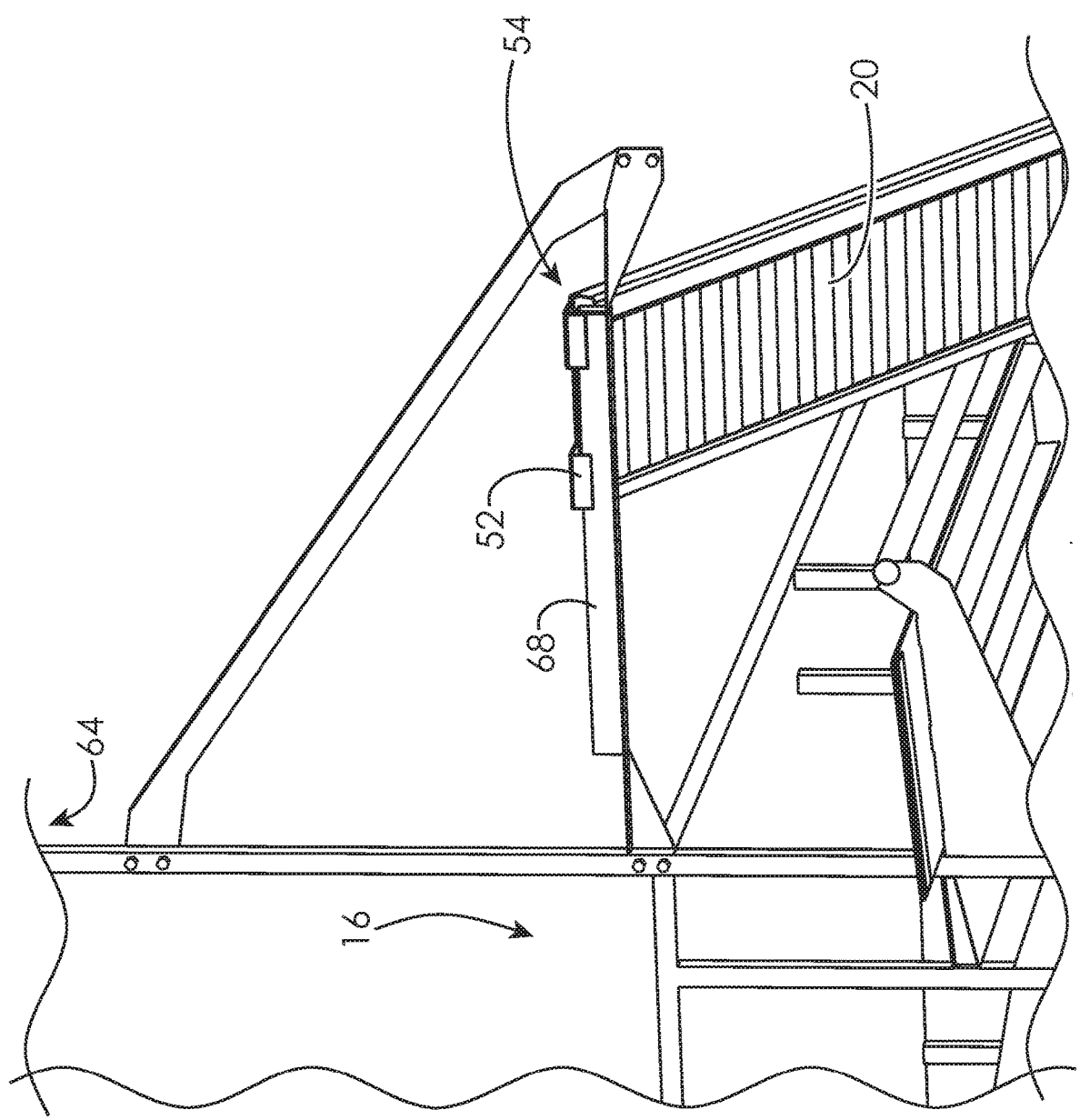
FIG. 10 is a perspective view of a walkway for an aviary in accordance with an embodiment.
Figure 11:
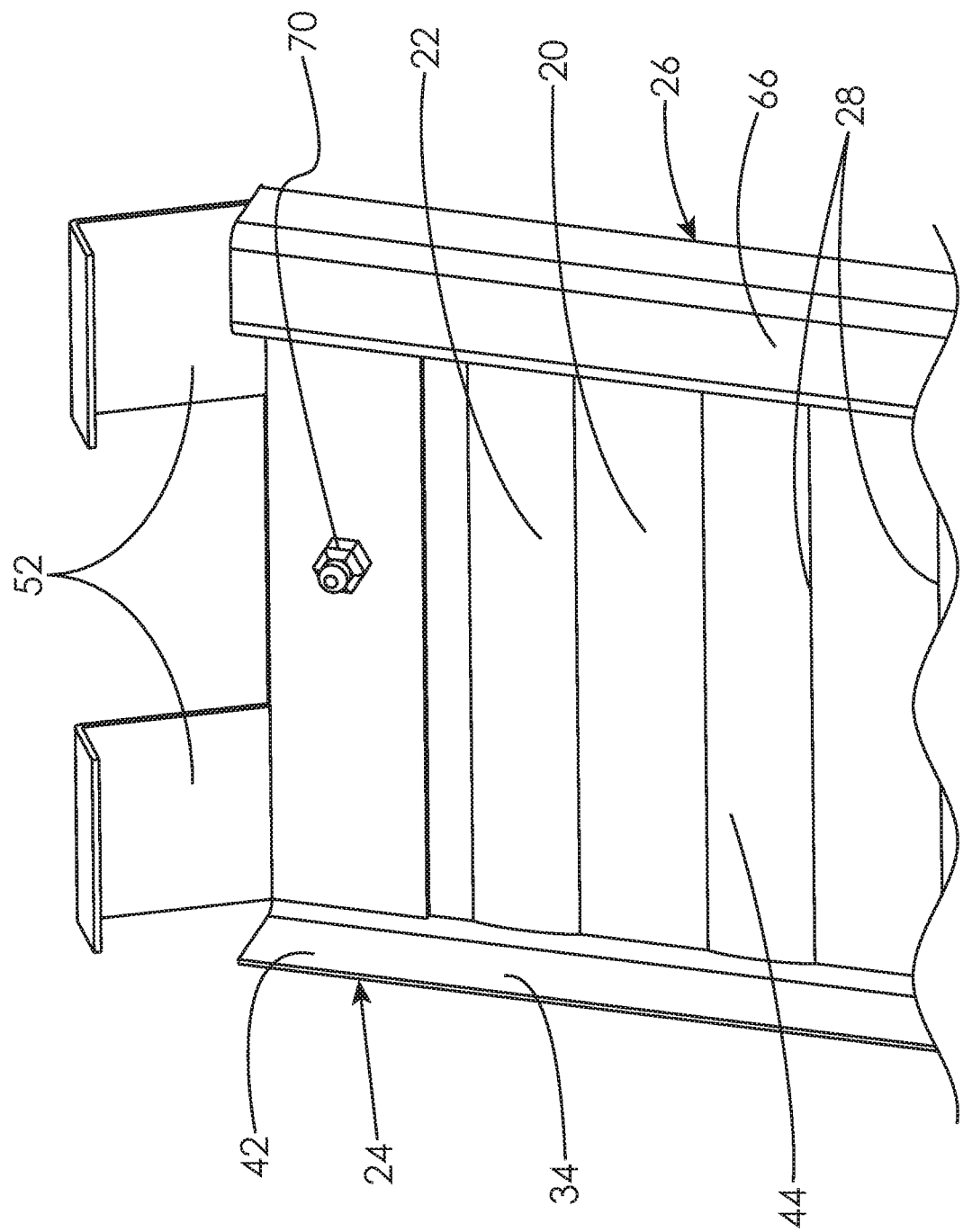
FIG. 11 is an enlarged perspective view of an underside of a walkway for an aviary in accordance with an embodiment.
Figure 12:
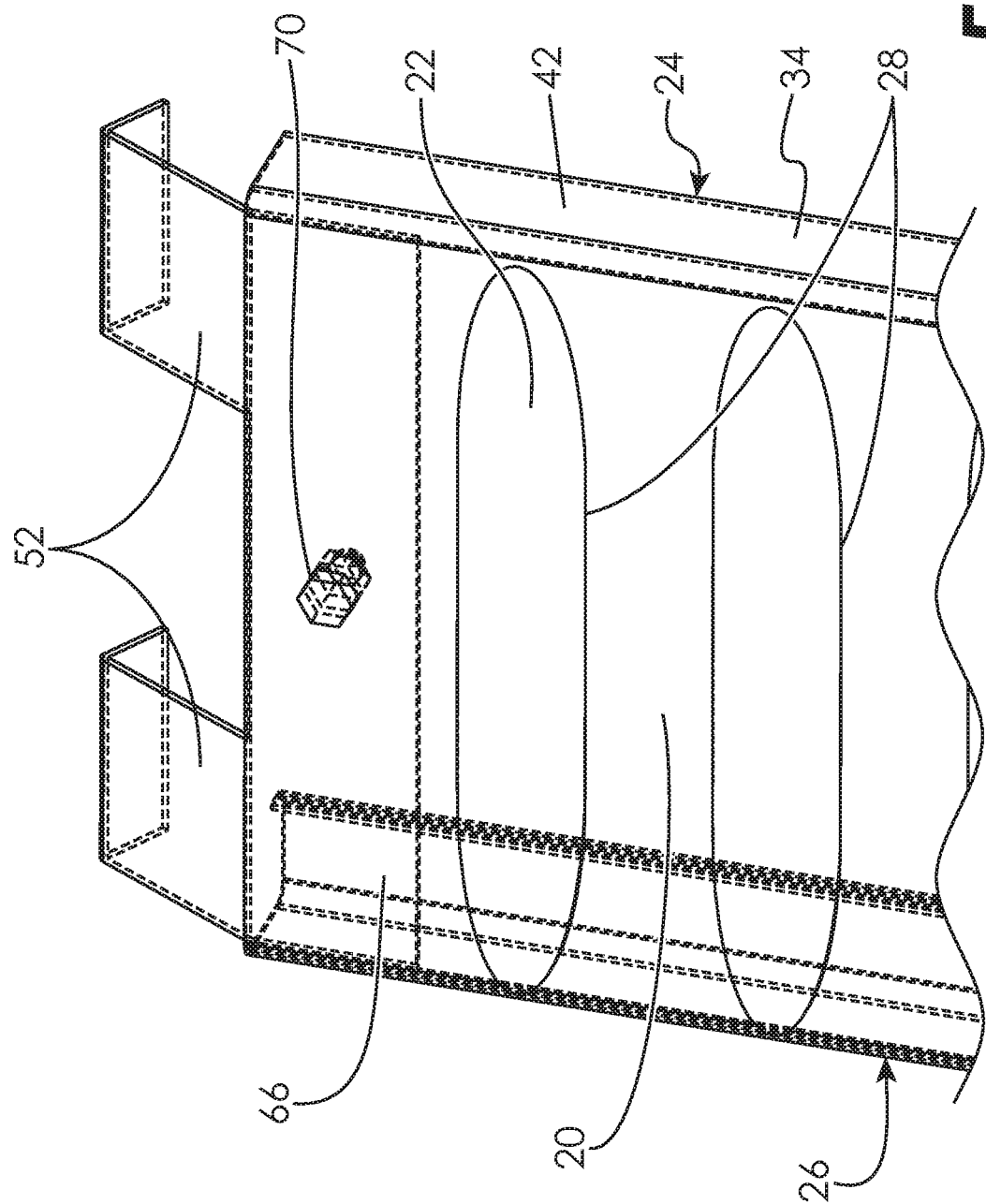
FIG. 12 is an enlarged perspective view of a top side of a walkway for an aviary in accordance with an embodiment.

Referring now to FIGS. 10-12, in one embodiment, each ramp 20 includes one or more hangers 52 configured as hooks positioned at an upper end 54 of the ramp 20. The hanger 52 couples to a hanger bracket 68. The hanger 52 supports the ramp 20 vertically and, in additional embodiments, supports the ramp 20 horizontally and vertically. The hanger 52 supports an upper end of the ramp 20 while one or more brackets 30 support the ramp 20 at a lower end and/or central portion of the ramp 20 in an embodiment. In embodiments where the hanger 52 and/or the bracket(s) 30 support the ramp 20 vertically, and particularly in embodiments where the hanger 52 and/or the bracket(s) 30 fixes the ramp 20 from horizontal movement, the ramp 20 is prevented from moving and/or falling and damaging birds, eggs, the tower 16, or any other object in the aviary 12.

In an embodiment, the brackets 30 support the ramp 20 at the upper end, the central portion, and/or the lower end of the ramp 20. In additional embodiments, the hanger 52 includes structure other than hooks to support the ramp 20. In one non-limiting example, the upper end of the ramp 20 includes a slot or other receiving structure (not shown) to allow positioning onto the hanger bracket 68. In another non-limiting example, one or more brackets 30 are coupled to the cage tower 16 to support the upper end of the ramp 20. One of ordinary skill in the art will recognize the many structures and methods of coupling the various portions of the ramp 20 to the to the cage tower 16, and such structures and methods form part of one or more embodiments of the present disclosure.

In the illustrated embodiment, the hanger bracket 68 extends from the cage tower 16. The hanger bracket 68 extends from the roof 64, in an embodiment (not shown). The hanger bracket 68 may extend into an aisle 18 or open space between the tower 16 and a wall of the aviary 12, in an embodiment. The hanger bracket 68 may extend between two cage towers 16, in an embodiment (not shown). The hanger 52 of the embodiment illustrated in FIGS. 11 and 12 is coupled to the ramp 20 with one or more fasteners 70, but it may be coupled to the ramp 20 via other means or formed integrally with the ramp 20.

As illustrated in FIGS. 11 and 12, the ramp 20 includes an upper portion 22 extending from a cage side 24 of the ramp 20 to an aisle side 26 of the ramp 20. The ramp 20 includes a first positioning member 34. The first positioning member 34 is located at the cage side 24 in an embodiment. The first positioning member 34 is a lip 42 extending from a bottom side 44 of the ramp 20 in an embodiment. The ramp 20 includes a channel 66 located at the aisle side 26 in an embodiment. The upper portion 22 in an embodiment includes one or more grooves 28. The grooves 28 aid a bird traversing the ramp 20 to access the cage tower 16 by providing traction.

The ramp 20 is corrugated to form the one or more grooves 28 in one embodiment. In an embodiment, the upper portion 22 is non-perforated and devoid of any holes or openings. In that embodiment, the ramp 20 avoids the risk that a bird might catch a toe or a claw in the ramp 20. In an embodiment, the ramp 20 is corrugated to permit a bird foot to grip the ramp. In that corrugated embodiment, the corrugated surface causes pressure differences across a bird's foot in contact with the surface to enable the surface to be relatively self-cleaning as the bird negotiates the ramp. A corrugated ramp 20 causes pressure differences in the pads of a bird's foot to improve a self-cleaning function of the ramp 20. Similar to the embodiment illustrated in FIG. 6, because the upper portion 22 of the ramp 20 illustrated in FIGS. 11 and 12 is non-perforated and devoid of any holes or openings, air flowing through the aviary 12 impinges on the upper portion 22 and moves more effectively in a downward and/or outward direction into the cage tower 16, thereby further enhancing manure drying in the cage tower 16.

The ramp 20 is formed from sheet metal in an embodiment. Those of ordinary skill in the art will recognize that any material suitable for bird traffic may be used to form the ramp 20, including but not limited to, metal, resilient materials, wood, plastic, et cetera. In an embodiment, the ramp 20 is formed from a material capable of being sanitized, such as by steam or chemical cleaning.

Figure 13:
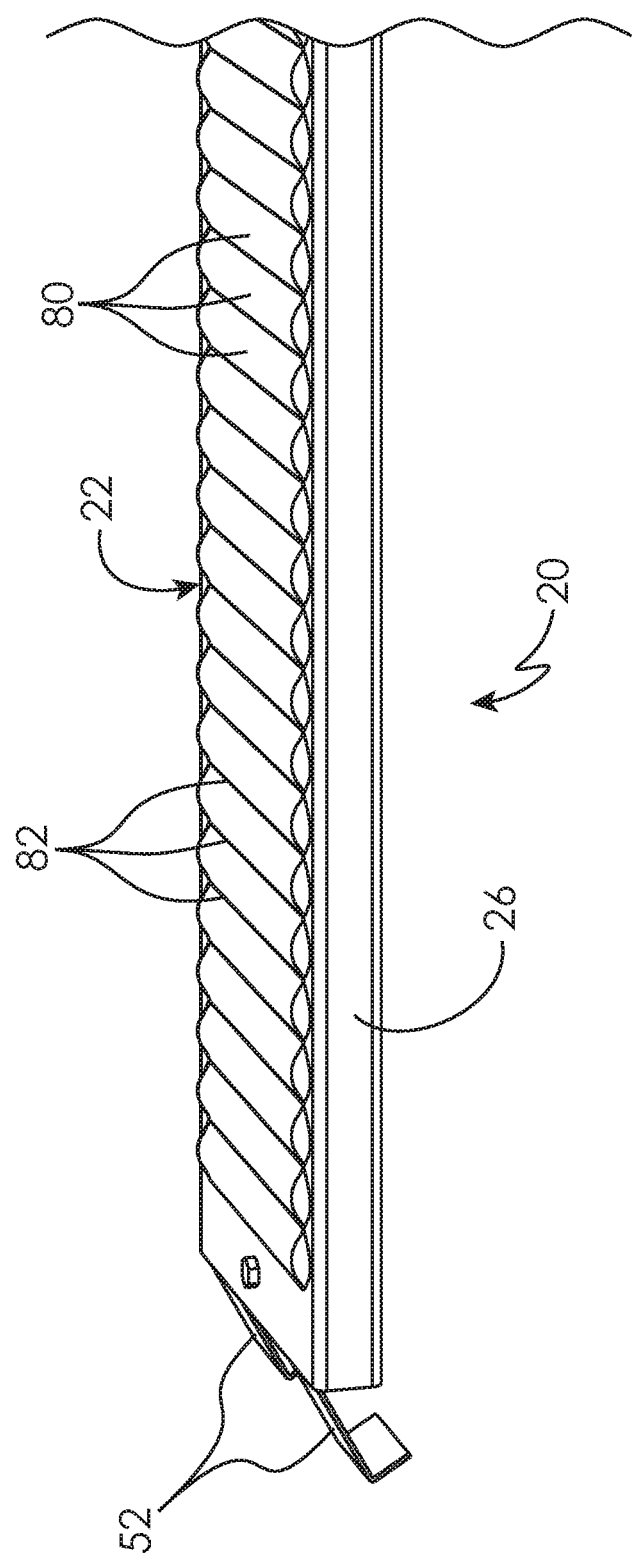
FIG. 13 is a side perspective view of a walkway for an aviary in accordance with an embodiment.

An embodiment of the ramp 20 is illustrated in FIG. 13. The upper portion 22 of the ramp 20 in the embodiment of FIG. 13 includes one or more grooves or ridges 80 and one or more troughs or valleys 82. The grooves 80 and troughs 82 aid the traverse of a bird on the ramp 20 by providing traction. Further, the grooves 80 and troughs 82 cause pressure differences in the pads of a bird's feet to improve a self-cleaning function of the ramp 20. Similar to the embodiment illustrated in FIGS. 11 and 12, because the upper portion 22 of the ramp 20 illustrated in FIG. 13 is non-perforated and devoid of any holes or openings, air flowing through the aviary 12 impinges on the upper portion 22 and moves more effectively in a downward and/or outward direction into the cage tower 16, thereby further enhancing manure drying in the cage tower 16. The ramp 20 is formed from sheet metal in an embodiment. Those of ordinary skill in the art will recognize that any material suitable for bird traffic may be used to form the ramp 20, including but not limited to, metal, resilient materials, wood, plastic, et cetera. In the embodiment of FIG. 13, the ramp 20 may be formed from a material capable of being sanitized, such as by steam or chemical cleaning.

Figure 14:
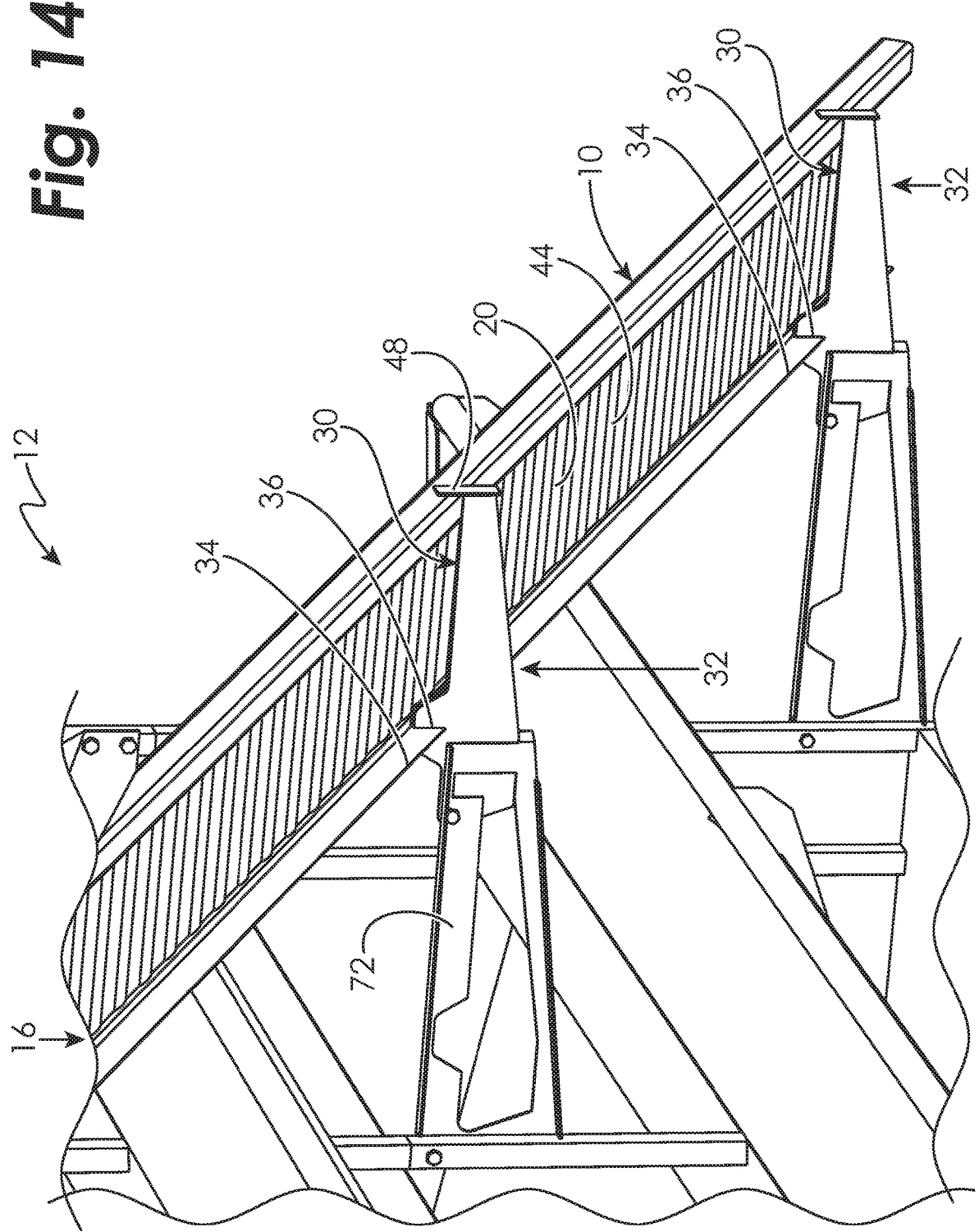
FIG. 14 is an enlarged perspective view of an underside of a walkway for an aviary in accordance with an embodiment.

Referring now to FIG. 14, one or more embodiments of the aviary 12 and walkway 10 further include one or more retractable brackets 30 or supports coupled to the cage tower 16. Each bracket 30 supports the ramp 20 in one embodiment when the bracket 30 is in an extended position 32. The walkway 10 of an embodiment includes the ramp 20 having a first positioning member 34, which first positioning member 34 extends below the ramp 20, and one or more brackets 30 disposed below the ramp 20. Each bracket 30 includes a second positioning member 36 configured to couple with the first positioning member 34 to fix the ramp 20 from horizontal movement. In an additional embodiment, the first positioning member 34 includes a slot and the second positioning member 36 includes a lip configured to engage with the slot. In additional embodiments, the first positioning member 34 and the second positioning member 36 are positioned adjacent the aisle side 26 rather than the cage side 24 or at a central portion of the one or more bracket(s) 30. In further embodiments, the first positioning member 34 and/or the second positioning member 36 comprise lips, protrusions, and/or slots extending horizontally to fix the ramp 20 from horizontal movement. One of ordinary skill in the art will recognize additional structures to fix the ramp 20 from horizontal movement, and such structures form part of one or more embodiments of the present disclosure. In one embodiment, one or more of the brackets 30 includes a third positioning member 48 that horizontally supports or fixes the ramp 20, as explained in further detail below.

Referring again to FIGS. 8 and 9 with continuing reference to FIG. 14, the cage tower 16 includes multiple vertically-aligned or stacked levels 40 in an embodiment. In additional embodiments, the levels 40 described herein refer to aviary cages. In additional embodiments, a plurality of aviary cages may be stacked to form one or more levels 40. In an embodiment, each of the brackets 30 is disposed at each of the levels 40. In an embodiment, each of the levels 40 includes a bracket 30.

As illustrated in the embodiments of FIGS. 15A, 15B, 16A, and 16B, the one or more brackets 30 are configured to support the ramp 20 and are retractable from the extended position 32 to a retracted position 38. The ramp 20 is fixed against horizontal movement when the at least one bracket 30 is in the extended position 32 supporting the ramp 20 and the first positioning member 34 is coupled to the second positioning member 36. In an embodiment, the ramp 20 is fixed against horizontal movement when another fixing means (not shown) is used.

In one embodiment, the ramp 20 is free to move upward when the at least one bracket 30 is in the extended position 32 and supporting the ramp 20. The first positioning member 34 and the second positioning member 36 allow upward movement of the ramp 20 when the first positioning member 34 is coupled with the second positioning member 36. In one embodiment, the first positioning member 34 is disposed on the cage side 24 of the ramp 20, while each of the brackets 30 includes a third positioning member 48 disposed on the aisle side 26 of the ramp 20. In the illustrated embodiment, the third positioning member 48 extends upward along the aisle side 26 of the ramp 20 to prevent movement of the ramp 20 in a horizontal direction. In additional embodiments, the third positioning member 48 includes a slot, lip, protrusion, or other structure known by a person having ordinary skill in the art to prevent movement of the ramp 20 in a horizontal direction. In additional embodiments, the third positioning member 48 is disposed on the cage side 24 of the bracket 30 or at a central portion of the bracket 30.

Figure 15B:
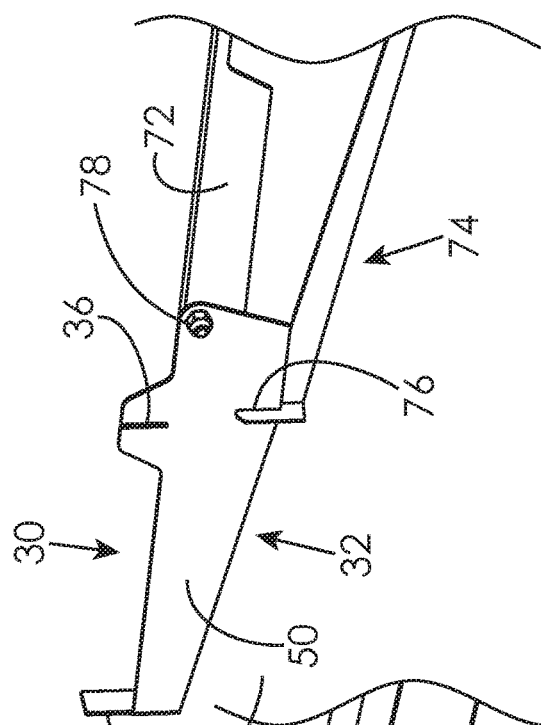
FIG. 15B is an enlarged perspective view of the bracket for the walkway for the aviary shown in FIG. 15A.
Figure 15A:
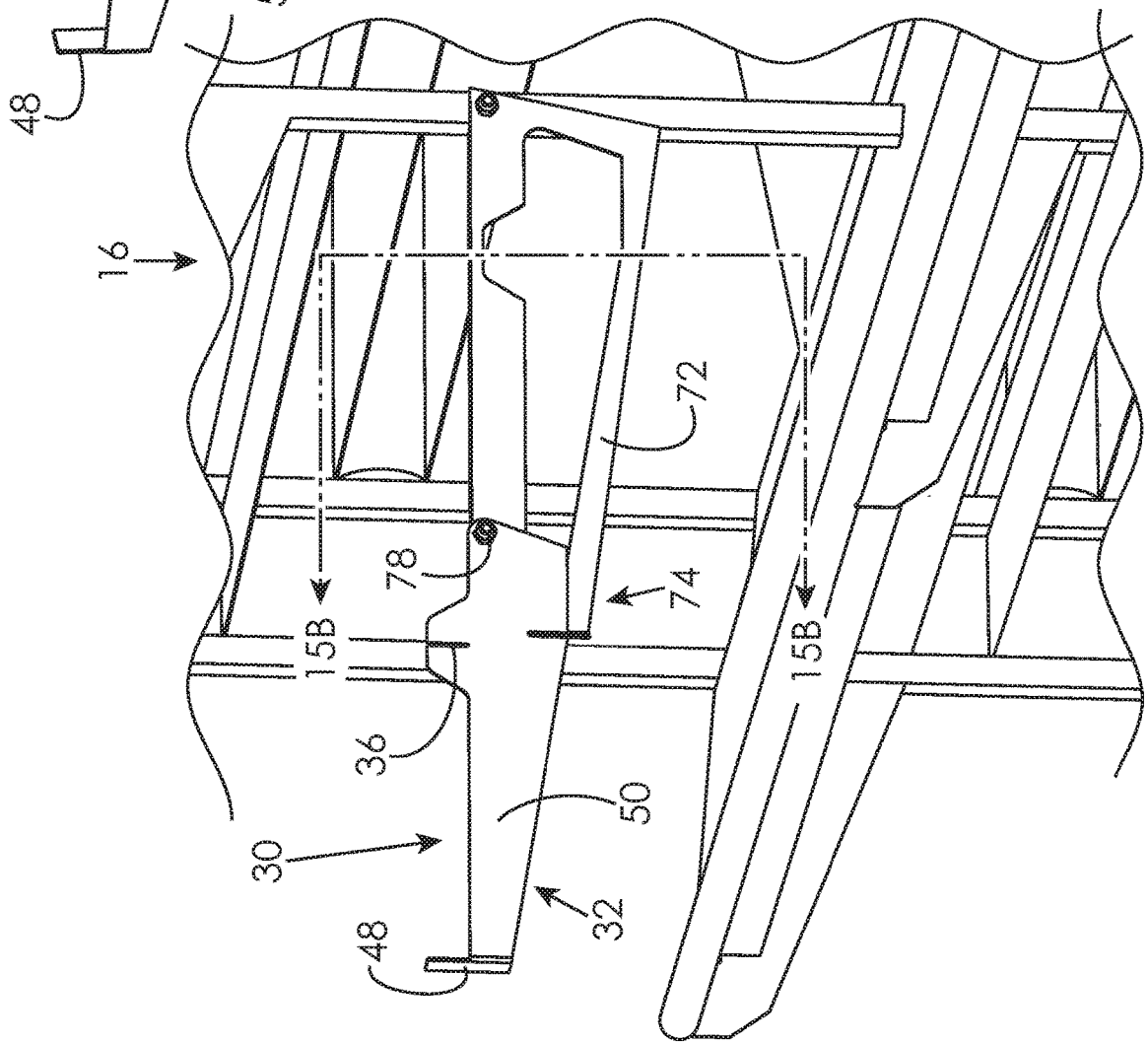
FIG. 15A is an enlarged perspective view of a bracket for a walkway for an aviary in accordance with an embodiment.

As illustrated in FIGS. 15A and 15B, the one or more brackets 30 each include an elongated portion 50 configured to support the bottom side 44 of the ramp 20 when the at least one bracket 30 is in the extended position 32 and supporting the ramp 20. The extended position 32 is defined by the elongated portion 50 extending in a substantially horizontal direction. The retracted position 38 is defined by the elongated portion 50 extending downward, as illustrated in the embodiment illustrated in FIGS. 16A and 16B.

As illustrated in the embodiments of FIGS. 15A, 15B, 16A, and 16B, the bracket 30 is coupled to a bracket support 72 connecting the bracket 30 to the cage tower 16. In an embodiment, the bracket support 72 is fixed to the cage tower 16, and the bracket 30 pivots at an outer end 74 of the bracket support 72. In an embodiment, the bracket 30 is coupled to the bracket support 72 by one or more bracket fasteners 78. One of ordinary skill in the art will recognize the various types of fasteners and fastening methods and structures capable of coupling the bracket 30 to the bracket support 72, and such fasteners and fastening methods and structures form part of one or more embodiments of the present disclosure. In an embodiment, when the bracket 30 is in the extended position 32, the bracket 30 rotates into and locks into position in a bracket support slot 76. In an embodiment, when the bracket 30 is in the extended position 32, the bracket support slot 76 is positioned below the second positioning member 36.

As illustrated in FIG. 14, the first positioning member 34 and the second positioning member 36 allow upward movement and prevent downward movement of the ramp 20 when the first positioning member 34 is coupled with the second positioning member 36. In an embodiment, the third positioning member 48 disposed on the aisle side 26 of the ramp 20 also allows upward movement of the ramp 20 when the ramp 20 is positioned on the bracket 30. In an embodiment, the at least one hanger 52 positioned at an upper end 54 of the ramp 20 allows upward movement of the ramp 20 when the ramp 20 is positioned on the bracket 30. As illustrated in the embodiment of FIGS. 10 and 14, the hanger 52 and each bracket 30 work together by each providing vertical support to a specific portion, such as an upper end, lower end, or central portion, of the ramp 20 while preventing that portion from sliding or otherwise moving horizontally. In additional embodiments, the hanger 52 and/or one or more brackets 30 provides only vertical or horizontal support. In such embodiments, supplementary horizontal or vertical support would be provided by another hanger 52 or bracket(s) 30. In such an arrangement, the ramp 20 may be easily removed from the brackets 30 and hanger bracket 68 by being lifted in a diagonal direction to disengage the at least one hanger 52 and then lifted upward until the ramp 20 is disengaged from the brackets 30 and hanger bracket 68. The retractable nature of the bracket 30 allows the bracket 30 to be moved away from the aisle 18, such as by pivoting the bracket 30 downward into the retracted position 38, as illustrated in FIGS. 16A and 16B.

In additional embodiments, the bracket 30 rotates or pivots upward toward the bracket support 72, rotates or pivots from a central portion of the bracket support 72 or other location of the bracket support 72, folds to the left toward the cage tower 16, folds to the right toward the cage tower 16, or is removable such that the bracket 30 is removed from the bracket support 72. In additional embodiments, the bracket 30 slides away from the aisle 18 into the retracted position 38 via one or more rails, telescopically, or by any other method known to a person having ordinary skill in the art. In additional embodiments, the bracket 30 swings horizontally away from the aisle 18 into the retracted position 38 via a hinge or by any other method known to a person having ordinary skill in the art. One of ordinary skill in the art will recognize the various structures and methods to provide a moveable, retractable, and/or removable bracket 30, and such methods and structures form part of one or more embodiments of the present disclosure. When the ramp 20 is removed and the bracket 30 is in the retracted position 38, the aisle 18 space or any open space between the cage tower 16 and wall of the aviary 12 is increased, and the cage tower 16 may be accessed more easily by workers for bird, egg, and debris removal, or other cleaning or maintenance operations.

In accordance with embodiments of the present disclosure, a method of training birds in the aviary 12 is provided. The method includes providing the aviary 12 having one or more aviary cages, providing a solid ramp 20, providing one or more brackets 30 or supports configured to support the ramp 20, fixing the one or more brackets 30 or supports to the one or more aviary cages, coupling the ramp 20 to the one or more brackets 30, and removing the ramp 20 from the one or more brackets 30 after a time period has lapsed.

In one embodiment, the time period is equal to a time period sufficient to allow the birds to acclimate to the one or more aviary cages. In another embodiment, the time period is equal to a time period sufficient for the birds to develop leg and wing muscles to facilitate hopping and flying in the aviary 12. The time period in one embodiment is one cycle, or a period of time when the cage tower 16 is occupied with laying hens.

The method further includes extending the bracket 30 to support the ramp 20 with the bracket 30 during the time period. Extending the bracket 30 includes any embodiment discussed above with regard to FIGS. 15 and 16. The method further includes retracting the bracket 30 after the time period has lapsed. Retracting the bracket 30 includes any embodiment discussed above with regard to FIGS. 15 and 16.

The ramp 20 is removed and the bracket 30 is retracted to conduct one or more operations in the cage tower 16 in particular embodiments. In one embodiment, at the beginning of a cycle, at the end of a cycle, and before or after a cleaning or maintenance operation, the ramp 20 is removed and the bracket 30 is retracted to clear a path for heavy bird moving carts or other carts, equipment, or personnel to bring birds into the system at the start of the cycle and remove the hens at the end of the cycle. If the ramp 20 is fixed to the cage tower 16 or the bracket 30 is not capable of being retracted, the ramp 20 and/or bracket 30 would impede the movement of and access by heavy bird moving carts or other carts, equipment, or personnel in the aviary 12.

In the aviaries 12 and methods of one or more embodiments of the present disclosure, the walkways 10 and/or ramps 20 assist the birds while they learn how to move from one level 40 to another or from one cage tower 16 to another across an aisle 18 or open space. The walkways 10 allow the birds to become familiar with hopping or flying between perches as a method to access various levels 40 of the cage tower 16. Further, because the ramp 20 is positioned in the path of moving air in the aviary 12, it causes turbulence and alters the direction of the airflow to enhance the manure drying capabilities of the moving air.

Because a walkway 10 may interfere with cage tower cleaning and maintenance operations, egg removal, debris removal, and bird placement or removal, the retractable or removable nature of the ramp 20 and or bracket 30 allows the aisle 18 to be opened by easily removing the ramp 20 on demand and/or at the end of a time period, such as the duration of a cycle. The ramp 20 itself is configured to be easily cleaned. The ramp 20 is also configured to be easily moved and removed and adds usable floor space to the system to allow for an increased number of birds in the aviary 12. Removal of the ramp 20 then allows cleaning and other operations in the aviary 12, increases the amount of space available in the open space next to the aviary cage or cage tower 16, and encourages birds to engage in various natural means of locomotion.

In contrast, merely placing a stairwell or stairs in the cage tower 16 takes up valuable living space on a permanent basis. Further, a stairwell requires extra effort to accomplish cleaning and maintenance of the cage tower 16 by reducing access to the cage tower 16 and adding additional surfaces for cleaning. A stairwell does not facilitate training of the birds to hop and fly, as so enabled by the walkways 10 and/or ramps 20 described herein, because a stairwell does not promote the behavior of hopping and flying in birds. A stairwell configured from wire mesh may also cause damage to the birds' feet and toes and is difficult to clean.

While the embodiments have been illustrated and described in detail in the drawings and foregoing description, the same is to be considered as illustrative and not restrictive in character, it being understood that only certain embodiments have been shown and described and that all changes and modifications that come within the spirit of the embodiments are desired to be protected.

What is claimed is:

1. An aviary walkway system, the system comprising:
   an aviary comprising one or more aviary cages, each of the one or more aviary cages comprising a bottom surface and at least one aviary cage side extending upward from the bottom surface;
   a ramp configured for positioning alongside the at least one aviary cage side of the one or more aviary cages; and
   at least one support member, each support member comprising a bracket support and a bracket coupled to the bracket support so as to allow rotational movement of the bracket relative to the bracket support, the bracket configured to support the ramp while the bracket is in an extended position and configured to be retractable, by rotating the bracket with respect to the bracket support, from the extended position to a retracted position closer to a plane containing the at least one aviary cage side than the extended position, wherein the ramp is fixed against horizontal movement when the bracket is in the extended position and supporting the ramp;
   wherein the ramp is free to move upward, without movement of the bracket, when the bracket is in the extended position and supporting the ramp.

2. The system of claim 1, wherein the extended position is defined by the bracket extending in a substantially horizontal direction.

3. The system of claim 1, wherein the retracted position is defined by the bracket extending downward.

\* \* \* \* \*